(12) United States Patent
Ogawa et al.

(10) Patent No.: US 6,611,956 B1
(45) Date of Patent: Aug. 26, 2003

(54) INSTRUCTION STRING OPTIMIZATION WITH ESTIMATION OF BASIC BLOCK DEPENDENCE RELATIONS WHERE THE FIRST STEP IS TO REMOVE SELF-DEPENDENT BRANCHING

(75) Inventors: Hajime Ogawa, Neyagawa (JP); Kensuke Odani, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/422,647

(22) Filed: Oct. 22, 1999

(30) Foreign Application Priority Data

Oct. 22, 1998 (JP) .............................. 10-300235

(51) Int. Cl.⁷ ................................................ G06F 9/45
(52) U.S. Cl. ........................................................ 717/152
(58) Field of Search ........................................ 717/152

(56) References Cited

U.S. PATENT DOCUMENTS

| | | | | |
|---|---|---|---|---|
| 5,539,907 A | * | 7/1996 | Srivastava et al. | 717/130 |
| 5,768,592 A | * | 6/1998 | Chang | 438/758 |
| 5,787,287 A | * | 7/1998 | Bharadwaj | 717/144 |
| 5,923,883 A | * | 7/1999 | Tanaka et al. | 717/156 |
| 5,978,588 A | * | 11/1999 | Wallace | 717/159 |
| 5,999,737 A | * | 12/1999 | Srivastava | 717/162 |
| 6,061,449 A | * | 5/2000 | Candelore et al. | 380/28 |
| 6,139,199 A | * | 10/2000 | Rodriguez | 717/159 |
| 6,189,141 B1 | * | 2/2001 | Benitez et al. | 717/153 |
| 6,202,199 B1 | * | 3/2001 | Wygodny et al. | 717/125 |
| 6,269,477 B1 | * | 7/2001 | Fitzgerald et al. | 717/131 |
| 6,289,507 B1 | * | 9/2001 | Tanaka et al. | 717/155 |
| 6,460,178 B1 | * | 10/2002 | Chan et al. | 717/147 |

FOREIGN PATENT DOCUMENTS

JP 11-73325 3/1999 .................. 717/152

* cited by examiner

*Primary Examiner*—Todd Ingberg
(74) *Attorney, Agent, or Firm*—Parkhurst & Wendel, L.L.P.

(57) ABSTRACT

An instruction string optimization apparatus is provided which estimates the size of a constant to be resolved as an address difference before linking instructions. The apparatus comprises code dividing means (202) for dividing a serial assembler code (201) into basic blocks, size dependence relation generation means (204) for analyzing size dependence relations among the sizes of the instruction string between basic blocks, estimation order determining means (206) for determining the order of basic blocks in which the size of a constant to be resolved as an address difference is determined and size determining means (208) for determining the size of the constant in each basic block according to the determined order, whereby the size of a constant to be resolved as an address difference can be estimated to be a value close to and not less than its actual size, the number of codes can be reduced, and the process speed by a linker can be improved.

11 Claims, 37 Drawing Sheets

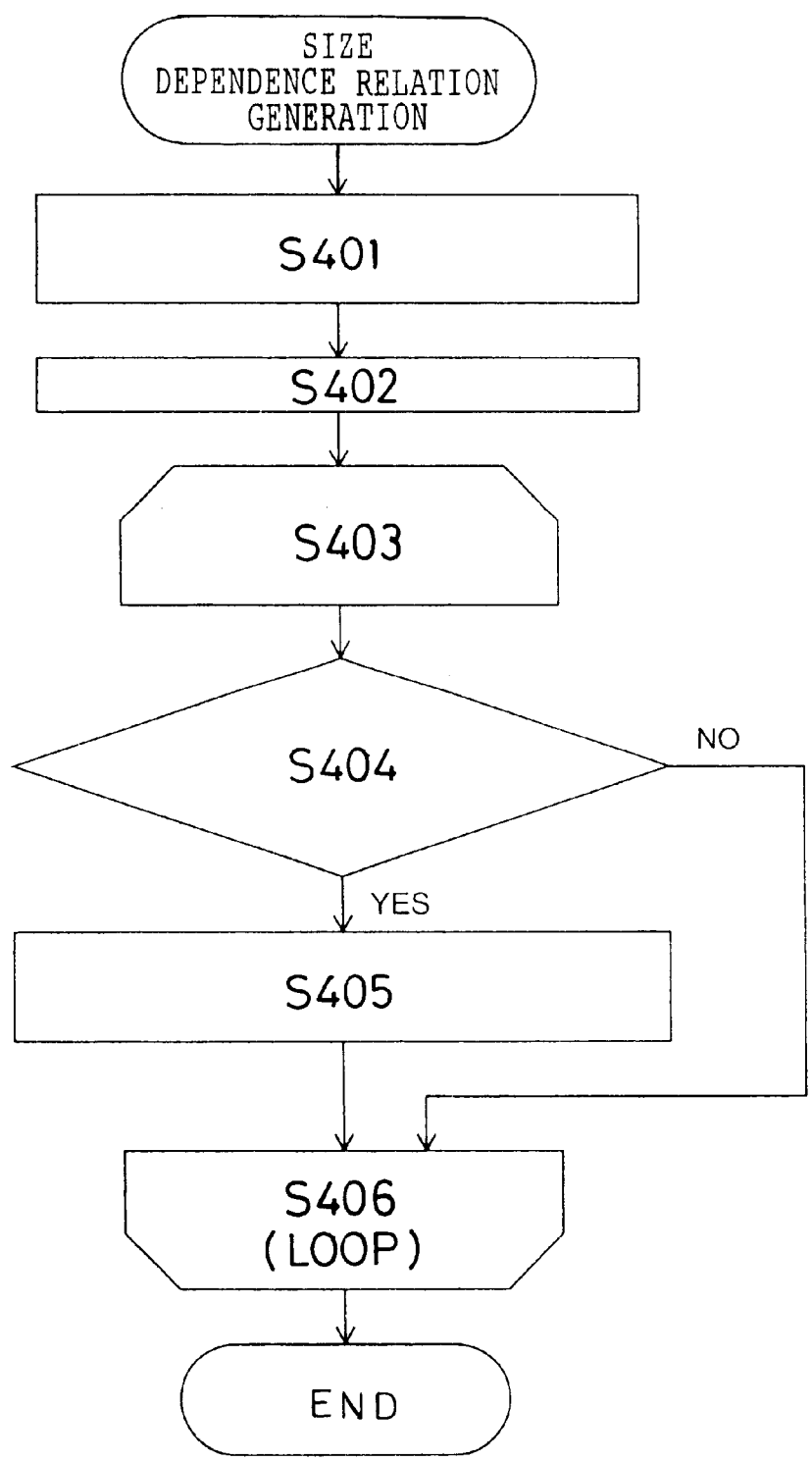

FIG. 7

```
    0x0000 mov r1,r0
    0x0002 mov r3,r2
    0x0004 cmp r0,r2
    0x0006 bne LD
    0x0008 add r0,r2
    0x000a mov r0,r1

0x000c mov r2,r5
    0x000e mov r2,r6
    0x0010 cmp r7,r6
    0x0012 bgt LE
LC:
    0x0014 add r2,1
LD:
    0x0016 cmp r2,r5
    0x0018 blt LC
LE:
    0x001a st r2,(r4)
```

FIG. 8

BASIC BLOCK A

0x0000 mov r1,r0 ··801
0x0002 mov r3,r2 ··802
0x0004 cmp r0,r2 ··803
0x0006 bne LD ··804

BASIC BLOCK B

0x0008 add r0,r2 ··805
0x000a mov r0,r1 ··806
0x000c mov r2,r5 ··807
0x000e mov r2,r6 ··808
0x0010 cmp r7,r6 ··809
0x0012 bgt LE ··810

BASIC BLOCK C

LC:
    0x0014 add r2,1 ··811

BASIC BLOCK D

LD:
    0x0016 cmp r2,r5 ··812
    0x0018 blt LC ··813

BASIC BLOCK E

BASIC BLOCK A
- 0x0000 mov r1,r0 ··1101
- 0x0002 mov r3,r2 ··1102
- 0x0004 cmp r0,r2 ··1103
- 0x0006 bne 0x0012 ··1104

BASIC BLOCK B
- 0x000a add r0,r2 ··1105
- 0x000c mov r0,r1 ··1106
- 0x000e mov r2,r5 ··1107
- 0x0010 mov r2,r6 ··1108
- 0x0012 cmp r7,r6 ··1109
- 0x0014 bgt 0b01000 ··1110

BASIC BLOCK C
LC:
- 0x0016 add r2,1 ··1111

BASIC BLOCK D
LD:
- 0x0018 cmp r2,r5 ··1112
- 0x001a blt 0b11100 ··1113

BASIC BLOCK E
LE:
- 0x001c st r2,(r4) ··1114

FIG. 14

BASIC BLOCK A

0x0000 mov r1,r0      · · 1401
    0x0002 mov r3,r2      · · 1402
    0x0004 cmp r0,r2      · · 1403
    0x0006 bne LD         · · 1404

BASIC BLOCK B

LB:
    0x0008 add r0,r2      · · 1405
    0x000a mov r0,r1      · · 1406
    0x000c mov r2,r5      · · 1407
    0x000e mov r2,r6      · · 1408
    0x0010 cmp r7,r6      · · 1409
    0x0012 bgt LE         · · 1410

BASIC BLOCK C

0x0014 add r2,1       · · 1411

BASIC BLOCK D

LD:
    0x0016 cmp r2,r5      · · 1412
    0x0018 blt LB         · · 1413

BASIC BLOCK E

BASIC BLOCK A
UNRESOLVED
    0x0000 mov r1,r0  · · 2101
    0x0002 mov r3,r2  · · 2102
    0x0004 cmp r0,r2  · · 2103
    0x0006 bne LD     · · 2104

BASIC BLOCK B
UNRESOLVED
    LB:
    0x0008 add r0,r2   · · 2105
    0x000a mov r0,r1   · · 2106
    0x000c mov r2,r5   · · 2107
    0x000e mov r2,r6   · · 2108
    0x0010 cmp r7,r6   · · 2109
    0x0012 bgt LE      · · 2110

BASIC BLOCK
C 2 BYTES
    0x0014 add r2,1    · · 2111

BASIC BLOCK
D UNRESOLVED
    LD:
    0x0016 cmp r2,r5   · · 2112
    0x0018 blt LB      · · 2113

BASIC BLOCK
E 2 BYTES
    LE:
    0x001a st r2,(r4)  · · 2114

FIG. 22

BASIC BLOCK A

0x0000 mov r1,r0   ·· 2201
    0x0002 mov r3,r2   ·· 2202
    0x0004 cmp r0,r2   ·· 2203
    0x0006 bne 0x0012  ·· 2204

BASIC BLOCK B

LB:
    0x000a add r0,r2    ·· 2205
    0x000c mov r0,r1    ·· 2206
    0x000e mov r2,r5    ·· 2207
    0x0010 mov r2,r6    ·· 2208
    0x0012 cmp r7,r6    ·· 2209
    0x0014 bgt 0b01000  ·· 2210

BASIC BLOCK C

0x0016 add r2,1  ·· 2211

BASIC BLOCK D

LD:
    0x0018 cmp r2,r5  ·· 2212
    0x001a blt 0xfff0  ·· 2213

BASIC BLOCK E

BASIC BLOCK C

LC:
    add r2,1 || nop      · · 2601

FIG. 26b

BASIC BLOCK D

LD:
    cmp r2,r5 || nop      · · 2602
    blt LC || nop      · · 2603

FIG. 26c

BASIC BLOCK E

LE:
    st r2,(r4) || nop      · · 2604

FIG. 26d

BASIC BLOCK B add r0,r2 || mov r0,r1      · · 2605
    mov r2,r5 || mov r2,r6      · · 2606
    cmp r7,r6 || nop      · · 2607
    bgt LE      · · 2608

FIG. 26e

BASIC BLOCK A mov r1,r0 || mov r3,r2      · · 2609
    cmp r0,r2 || nop      · · 2610
    bne LD      · · 2611

FIG. 27

BASIC BLOCK A

0x0000 mov r1,r0 || mov r3,r2 ·· 2701
    0x0004 cmp r0,r2 || nop ·· 2702
    0x0008 bne 0x0018 ·· 2703

BASIC BLOCK B

0x000c add r0,r2 || mov r0,r1 ·· 2704
    0x0010 mov r2,r5 || mov r2,r6 ·· 2705
    0x0014 cmp r7,r6 || nop ·· 2706
    0x0018 bgt 0x0010 ·· 2707

BASIC BLOCK C

LC:
    0x001c add r2,1 || nop ·· 2708

BASIC BLOCK D

LD:
    0x0020 cmp r2,r5 || nop ·· 2709
    0x0024 blt 0b11000 || nop ·· 2710

BASIC BLOCK E

LE:
    0x0028 st r2,(r4) || nop ·· 2711

FIG. 28a

| BASIC BLOCK | DEPENDED BASIC BLOCK |
|---|---|
| A | |
| B | |
| C | |
| D | |
| E | |

FIG. 28b

| BASIC BLOCK | DEPENDED BASIC BLOCK |
|---|---|
| A | B、C |
| B | |
| C | |
| D | |
| E | |

FIG. 28c

| BASIC BLOCK | DEPENDED BASIC BLOCK |
|---|---|
| A | B、C |
| B | C、D |
| C | |
| D | C、D |
| E | |

INSTRUCTION STRING OPTIMIZATION WITH ESTIMATION OF BASIC BLOCK DEPENDENCE RELATIONS WHERE THE FIRST STEP IS TO REMOVE SELF-DEPENDENT BRANCHING

FIELD OF THE INVENTION

The present invention relates to an instruction string optimization apparatus for a processor using variable length instructions, more specifically, to a technology for estimating constant values in relative branch instructions in an instruction string.

BACKGROUND OF THE INVENTION

The sizes of instructions containing a constant used in a processor using a set of variable-length instructions vary depending on the size of the constant.

For example, consider instruction formats shown in FIGS. 1a to 1c. While the size of an instruction which contains a constant of five bits or less is only 16 bits (FIG. 1b), the size of an instruction which contains a constant of more than five bits is 32 bits (FIG. 1c).

Particularly, in an instruction which contains an address value or an address difference value as a constant, the exact size of the constant is not known until a number of relocatable codes are linked and an address is allocated to each instruction by a linker.

However, the sizes of instructions are used for certain optimization of various instruction strings performed prior to the linkage of the instructions. In order to determine the size of an instruction containing an address value or an address difference value as a constant, such as a function call instruction and a branch instruction, the size of the constant must be estimated.

In conventional instruction string optimization apparatuses, approaches to estimate the size of a constant to be resolved as an address or address difference value before linkage are used which estimate the constant size to be the maximum constant size or a constant size most frequently used in a processor of interest.

However, each of these prior art apparatuses has a certain problem associated with the estimation of the constant size before linkage.

With the approach which estimates a constant size to be the maximum constant size used in a processor of interest, a large number of long instructions are produced, and instructions of a size larger than necessary are generated, thus increasing the number of codes. Furthermore, in a very long instruction word (VLIW) processor, the number of instructions which can be parallelized because the number of instructions in a single long word instruction decreases, thus decreasing the performance of the processor.

With the approach which estimates a constant size to be the size of a constant which is most frequently used, if the estimated size is smaller than an actual size and the actual size is identified after addresses are allocated to instructions by an linker, each of the instructions must be converted into an instruction corresponding to that size, thus decreasing the processing speed of the linker. Furthermore, in VLIW processors, in addition to the conversion of instructions into instructions corresponding to the actual size, parallelization re-scheduling of the instructions is required, leading further lowering of the processing speed of the linker.

Therefore, a facility is needed for an instruction string optimization apparatus, which estimates the size of a constant so as to be a size close to and not less than the actual size of a constant which is resolved as an address difference value which can be estimated to some extent based on its relative position in a function before linkage.

The present invention is provided in view of above-mentioned problems and an object of the present invention is to provide an instruction string optimization apparatus used for processors which perform variable-length instructions and VLIW processors.

SUMMARY OF THE INVENTION

To attain the above-mentioned object, an apparatus of the present invention is characterized by comprising: code dividing means for dividing an instruction string comprising serially arranged instructions into sets of basic blocks each of the blocks being a string of sequential instructions having no branch in or branch out in the middle of the string; size dependence relation generation means for generating a size dependence relation representing the correspondence between a basic block having a constant to be resolved as an address difference and a depended basic block, the latter basic block being depended on by the former basic block and comprising an instruction string having a size on which the size of said constant depends; estimation order determining means for determining the order in which constants to be resolved as an address difference of a basic block are estimated; and size determining means for determining an unresolved size of said constant in a basic block selected according to said estimation order or determining an unresolved size of an instruction which uses said constant to be resolved in a basic block selected according to said estimation order.

BRIEF DESCRIPTION OF THE DRAWINGS

FIG. 1a shows a short instruction for an inter-register operation, FIG. 1b shows a short instruction using a 5-bit constant, and FIG. 1c shows a long instruction using a long constant of six bit or more;

FIG. 3a shows a forward dependence relation and FIG. 3b shows backward dependence relations;

FIG. 4 shows a flowchart of a process performed in size dependence relation generation means 204;

FIG. 7 shows an example of a serial assembler code 201;

FIG. 8 shows a basic block division code 203 output from code dividing means 202 when the serial assembler code shown in FIG. 7 is input to the code dividing means 202;

FIG. 11 shows a size resolution code 209 output from the size determining means 208 when the basic block division code 203 in FIG. 8 and the estimation order list 207 in FIG. 10c are input to the size determining means 208;

FIG. 14 is a diagram for explaining an example of basic block division code 203 output from the code dividing means 202;

FIG. 21 shows a size resolution code 1810 which is output when the basic block division code 1803 in FIG. 14 and the estimation order list 1807 are input to the size determining means 1809;

FIG. 22 shows a size estimation code 1812 which is output when the graph 1808 containing a cyclic relation shown in FIG. 15d and the size resolution code 1810 in FIG. 21 are input to the size estimation means 1811;

FIG. 23a shows a format comprising two short instructions and FIG. 23b shows a format consisting one long instruction;

FIG. 24a shows a 15-bit short instruction for an inter-register operation, FIG. 24b shows a short instruction using a 5-bit constant, and FIG. 24c shows a 30-bit long instruction using a constant of six bits or more;

FIGS. 26a through 26e show a long word instruction string of each basic block after the basic block division code 203 in FIG. 8 and the estimation order list 207 in FIG. 10c are input to the size determining means 208 and rearranged;

FIG. 27 shows a size resolution code 209 which is output when the basic block division code 203 shown in FIG. 8 and the estimation order list 207 in FIG. 10c are input to the size determining means 208;

FIGS. 28a through 28c show tables when the size dependence graphs 205 in FIG. 9 is represented on a computer;

DESCRIPTION OF THE EMBODIMENTS

An embodiment of an instruction string optimization apparatus according to the present invention will be described below with reference to the drawings.

DESCRIPTION OF TERMINOLOGY

First, terms used herein will be described.

A "basic block" refers to an instruction string having no branch in or branch out in the middle of the string.

A "branch" refers to a jump into the same function. A jump out of the function, for example, a function call, is not included in the term "branch."

A "VLIW (very long instruction word)" and "long word instruction" refers to a code which specifies a set of operations executed in parallel in one cycle.

A "instruction" (excluding a "long word instruction") refers to a code corresponding to one operation.

Embodiment 1

Processor used with the invention

Before describing the present instruction string optimization apparatus, functionality which a processor used with the apparatus should provide will be described.

(Architecture)

The processor used with the present apparatus is a variable-length, single instruction architecture processor and includes instruction memory, a program counter, an instruction fetch circuit, an instruction register, an instruction decoder, an arithmetic and logic unit, a general-purpose register, data memory, a bus for transmitting data and addresses, and other components which a conventional processor includes.

Figure 1A:
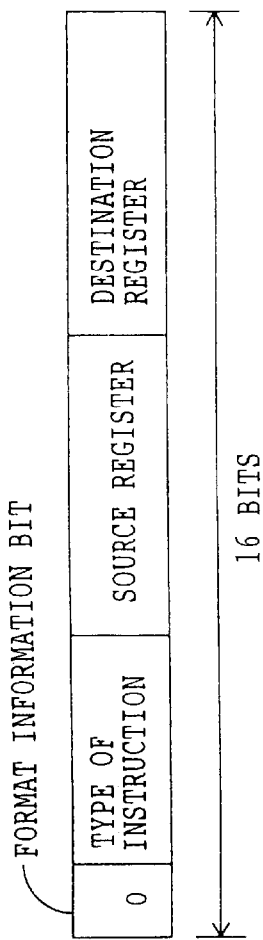
FIGS. 1a through 1c show instruction formats used by a processor of interest.
Figure 1B:
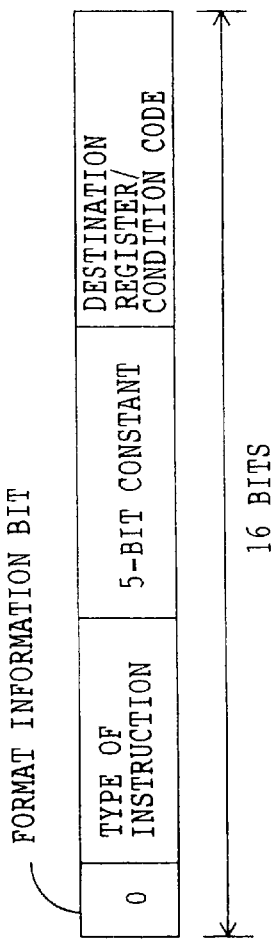
Figure 1C:
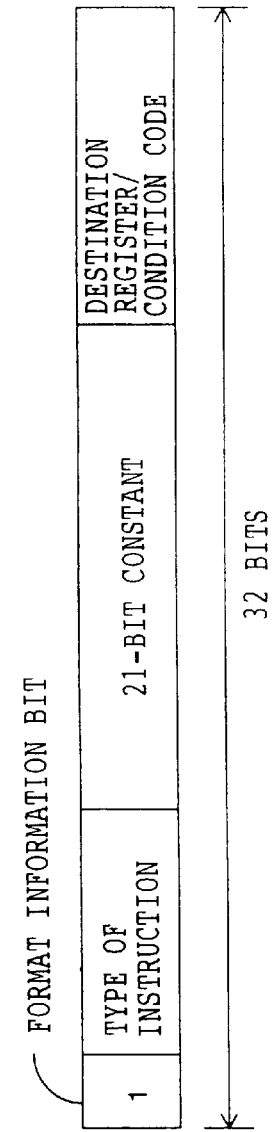

FIGS. 1a through 1c shows formats of instructions executed by the processor. Short instruction of two bytes (FIGS. 1a, 1b) and long instructions of four bytes (FIG. 1c) are used and distinguished by a format information bit at the beginning of the instruction. The instruction decoder in the processor references the format information bit and decodes the instruction as a 2-byte instruction if the format information bit is "0" or a 4-byte instruction if the bit is FIG. 1a shows a 2-byte instruction for an inter-register operation. FIG. 1b shows a 2-byte instruction using a 5-bit constant and FIG. 1c shows a 4-byte instruction using a long constant of 21 bits. The right most field specifies a destination register if the type of the instruction is an operation instruction or a transfer instruction, or specifies a branch condition code if the instruction type is a branch instruction.

As a branch instruction, a relative branch instruction is used which uses a difference between the address of the branch instruction and the address of the branch target as a constant.

Among the instruction sets used by the processor, main instructions are:

(Example 1) "mov r1, r0": transfers a value from register r1 to register r0.

(Example 2) "add r0, r2": adds a value in register r0 to a value in register r2 and stores the result in register r2.

(Example 3) "st r2, (r4)": writes a value in register r2 into an address in register r4.

(Example 4) "cmp r0, r2": subtracts a value in register r2 from a value in register r0 and sets a condition flag indicating an overflow, positive or negative, etc.

(Example 5) "bcc LA": references the above-mentioned condition flag and branches to label LA according to the condition. LA is a displacement of 5 bits or 21 bits relative to the address of this instruction.

Figure 2:
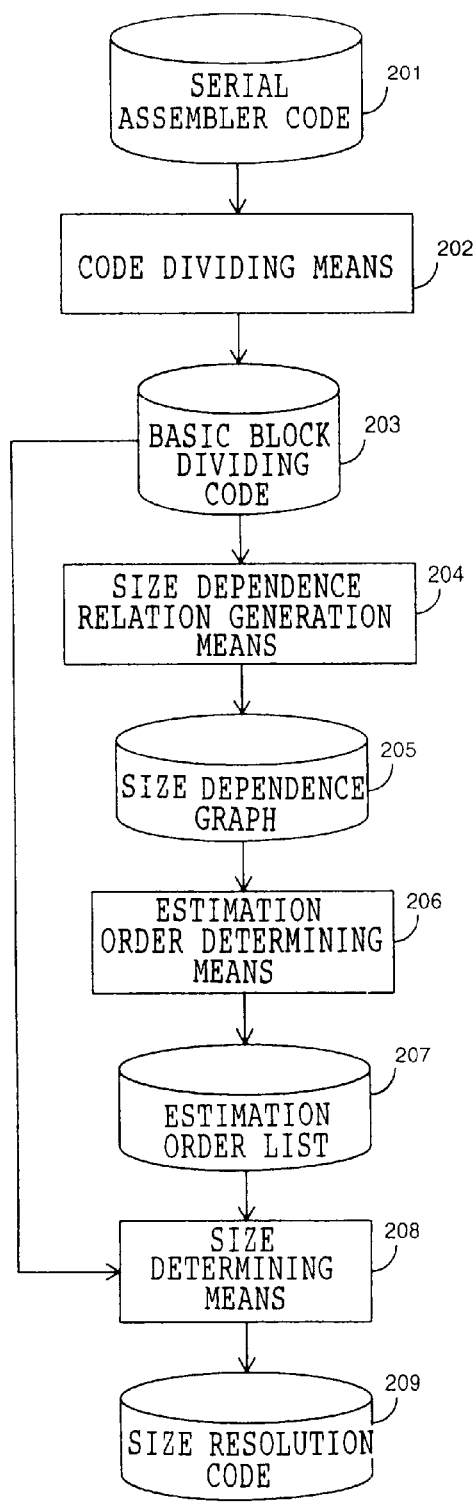
FIG. 2 shows a block diagram of a configuration and input/output data of an instruction string optimization apparatus.

Configuration of the Instruction String Optimization Apparatus of a First Embodiment FIG. 2 shows a configuration of the instruction string optimization apparatus according to a first embodiment.

This instruction string optimization apparatus uses a serial assembler code 201 output from a compiler as an input, determines the size of a constant to be resolved as an address difference and outputs a size resolution code 209, as described below.

First, code dividing means 202 divides the serial assembler code 201 into basic blocks and outputs the result as a basic block division code 203.

Then, size dependence relation generation means 204 analyzes size dependence relations between instruction strings of the basic blocks and outputs the result as a size dependence graph 205.

Estimation order determining means 206 determines, based on the size dependence graph 205, the order of basic blocks in which the size of said constant is determined and outputs the result as an estimation order list 207. Size determining means 208 determines the size of said constant in each basic block in the basic block division code according to the order indicated by the estimation order list 207 and outputs the result as a size resolution code 209.

Each of the above-mentioned means will be described in detail below.
(Code Dividing Means 202)

The code dividing means 202 reads an input serial assembler code 201, divides the instruction string into basic blocks and output the result as a basic block division code 203. This process is the same as the basic block division process performed in conventional instruction string optimization apparatuses.

(Size dependence relation generation means 204)

The size dependence relation generation means 204 analyzes dependence relations among the sizes of instruction strings of basic blocks in the basic block division code 203 provided by the code dividing means 202 and outputs the results as a size dependence graph 205.

The dependence relations being analyzed are described below.

Basic block A is said to be dependent on a basic block in terms of the size of the instruction string in the following situation.

If basic block A contains an instruction having a constant to be resolved as an address difference i.e. a relative branch instruction specifying a displacement) and the size of that constant cannot be determined until the instruction string sizes of basic blocks are determined, basic block A is dependent on these basic blocks comprising an instruction string having a size on which the size of the constant of the basic block A depends. Hereinafter, such basic block that is thus depended on by basic block A will be called a "depended basic block".

The dependence relation is described with reference to FIGS. 3a and 3b.

Figure 3A:
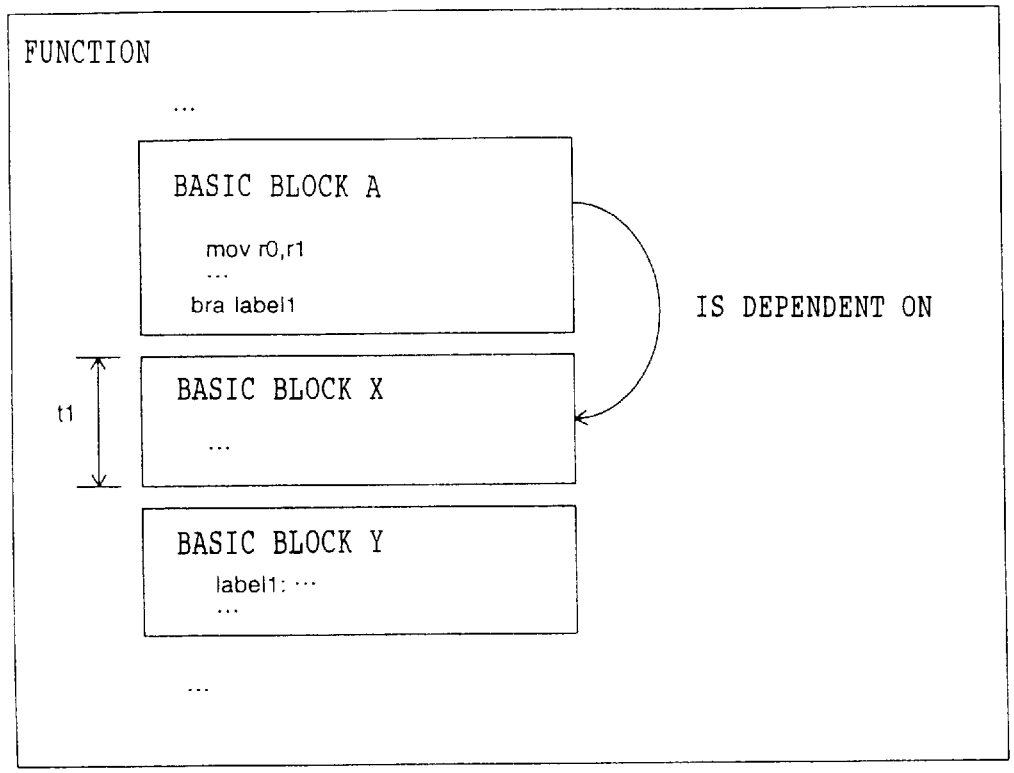
FIGS. 3a and 3b are diagrams for explaining the code size dependence relation between basic blocks.

FIG. 3a shows a part of an exemplary basic block division code 203 in which basic blocks A, X, and Y appear in sequence. As can be seen in basic block A, there is a relative branch instruction "bra label1," which indicates that basic block A branches forward to basic block Y. In this case, it is determined that the value indicated by the constant "label1" is equals to the size of instruction string t1, i.e. basic block X. Once the value of the constant "label1" is determined, the size of the relative branch instruction "bra label1," is determined and therefore the size of basic block A is determined. Thus, in FIG. 3a, basic block A is dependent on basic block X.

Figure 3B:
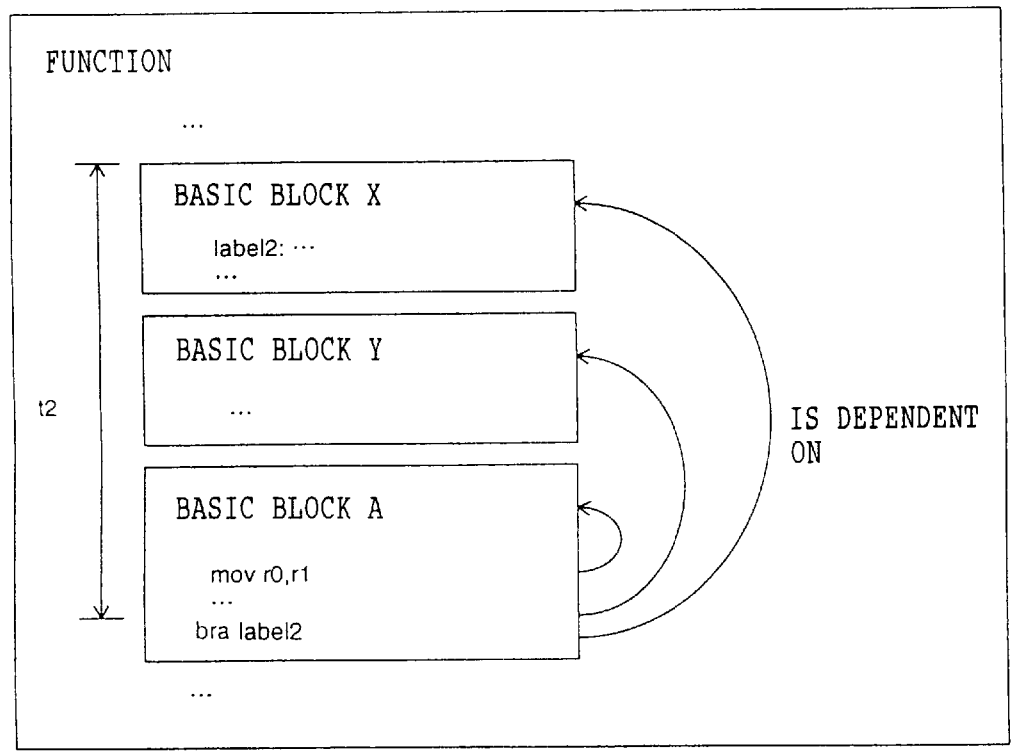

FIG. 3b also shows a part of another exemplary basic block division code 203. In this case, blocks X, Y, and A appears in sequence in this order.

As can be seen in block A, there is a relative branch instruction "bra label2" and basic block A branches backward to basic block X. In this case, it is determined that the value indicated by the constant "label2" is equal to the size of instruction string t2 and therefore is dependent on the instruction string sizes of the three basic blocks: X, Y, and itself, A.

Once the value of label2 is determined, the size of the relative branch instruction "bra label2", and therefore the size of block A. Thus, in FIG. 3b, basic block A is dependent on three basic blocks X, Y, and A. In basic block A, only the part of the instruction string excluding the instruction "bra label2", is depended on and the size of this part has already been determined.

That is, if a basic block depends on itself, it is apparent that the size of the depended part of the instruction string is determined.

These dependent relation will be analyzed and the process for generating size dependence graph 205 will be described in detail.

FIG. 4 shows a flowchart of a process performed in the size dependence relation generation means 204.

First, among the constants contained in the basic block division code 203, the sizes of constants except those constants that should be resolved as an address differences (i.e. displacements of relative branch instructions) are determined based on an appropriate value, for example the maximum constant size used in a processor of interest (step S401). Similarly, among said constants, the sizes of those constants that are represented as an address difference relative to the address of an instruction such as a function call instruction, which is external to the functions appearing within the block are determined based on an appropriate value.

Thereafter, a size dependence graph 205 is created as described bellow. First, a node representing each basic block is created (step S402). Then, the following process (steps S404 to S405) is repeated (step S403) for each basic block.

First, it is determined whether the basic block under consideration contains a constant to be resolved as an address difference (step S404).

If yes, directed edges are drawn from all the nodes which represent depended basic block to the basic block under consideration (step S405). The direction of these directed edges is opposite to that of dependence.

In this way, the size dependence graph 205 is created by analyzing dependence relations among the basic blocks.
(Estimation Order Determining Means 206)

The estimation order determining means 206 determines, based on the size dependence graph 205 provided by the size dependence relation generation means 204, the order of basic blocks in which a constant to be resolved as an address difference is determined and outputs an estimation order list Because in the size dependence graph 205 a basic block corresponding to a node to which a directed edge comes is dependent on a basic block corresponding to a node from which the directed edge goes out, the size of a constant to be resolved as an address difference in a basic block corresponding to a node to which no directed edge comes can be determined. In addition, the size of a constant in an basic block corresponding to a node to which a directed edge comes from only itself can be determined, because, as described earlier, the size of the depended part of the basic block has been already determined.

Once the sizes of the constants in a basic block are determined, the size of the instruction string of the basic block is determined and dependence relation on the basic block is resolved. Therefore, all the directed edges going out from the node corresponding to the basic block can be removed.

Figure 5:
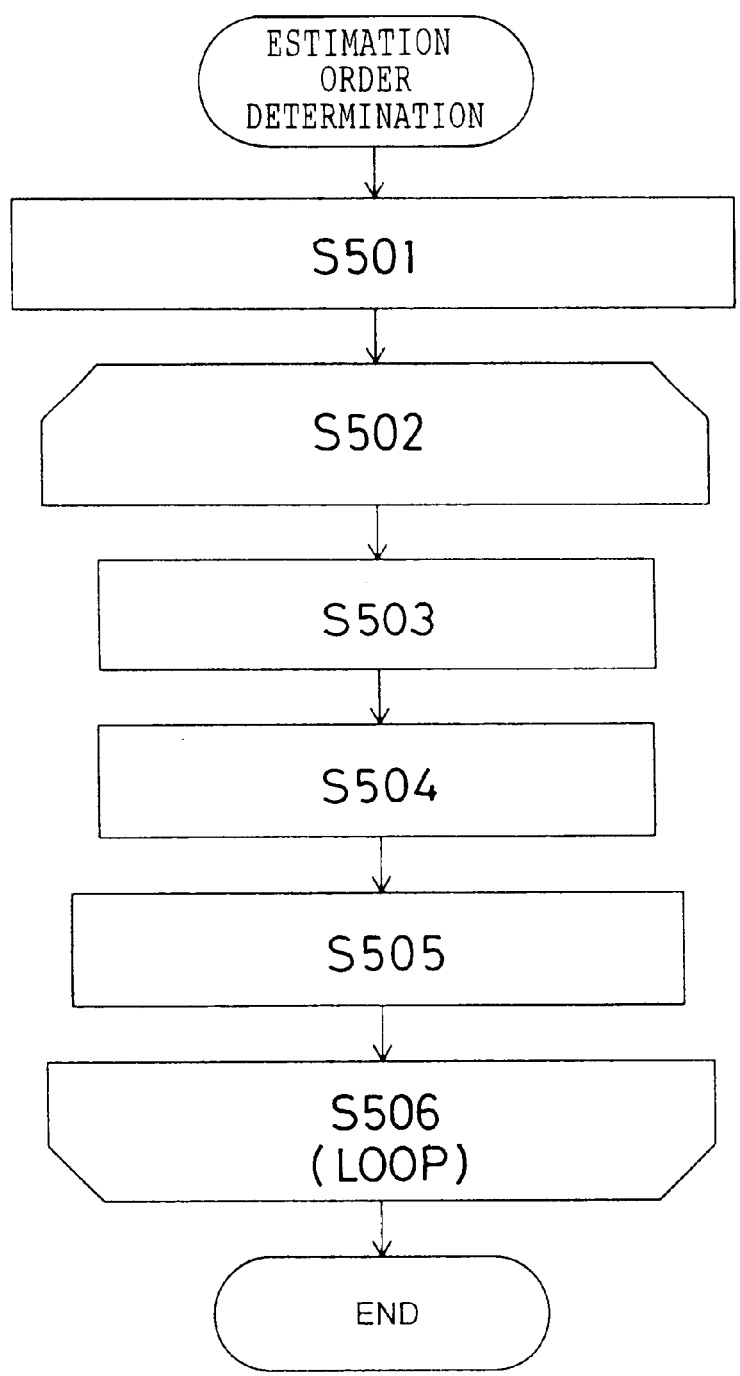
FIG. 5 shows a flowchart of a process performed in estimation order determining means 206.

FIG. 5 shows a flowchart of a process performed in the estimation order determining means 206.

First, all directed edges which represent self-dependence between a node and itself in the size dependence graph 205 are removed (step S501).

In order to create an estimation order list 207, the following process (steps S503 through S505) is repeated until no node remains in the size dependence graph 205 to which no directed edge comes (step S502).

First, in the size dependence graph 205, any one of the nodes to which no directed edge comes is selected (step S503).

The selected node and all directed edges which go out from the node are removed from the size dependence graph (step S504).

Then, the basic block corresponding to the selected node is appended to the estimation order list 207 (step S505).

In this way, the order in which basic blocks are estimated is determined based on the size dependence graph 205 to generate the estimation order list 207.
(Size Determining Means 208)

The size determining means 208 determines, according to the order of the basic block indicated by the estimation order list 207 provided by the estimation order determining means 206, the size of a constant to be resolved as an address difference in each basic block in a basic block division code 203 provided by the code dividing means 202, and outputs the result as a size resolution code 209.

Figure 6:
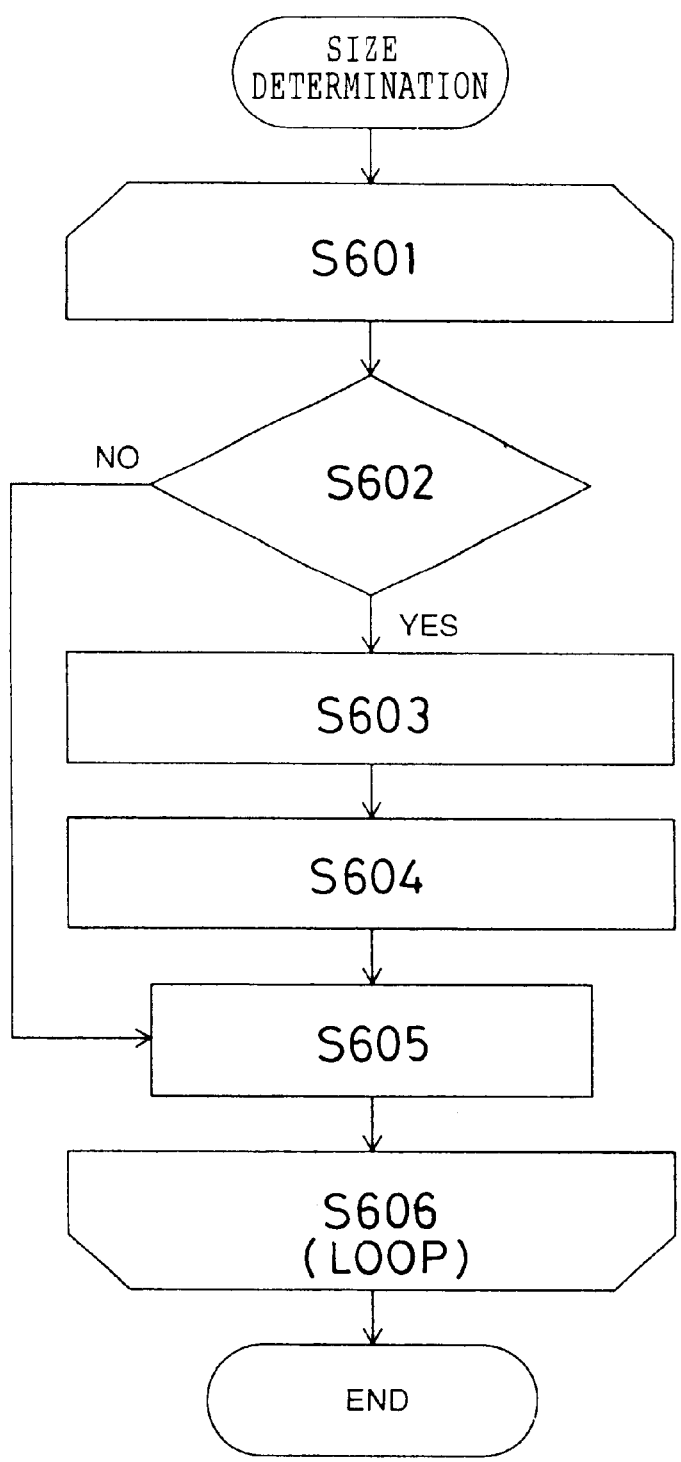
FIG. 6 shows a flowchart of a process performed in size determining means 208.

FIG. 6 shows a flowchart of a process performed in the size determining means 208.

Basic blocks are selected in the estimation order list 207, one block at a time, from the top to the bottom of the list and the following process (steps S602 through S605) is repeated until all the basic blocks in the list are selected and the size of a constant to be resolved as an address difference is determined (step S601).

First, it is determined whether the selected basic block contains a depended basic block (step S602). If no, the process proceeds to step S605.

On the other hand, if the selected basic block contains depended basic blocks, the sum of the sizes of instruction strings in all of the depended basic blocks and determines the sizes of the above-mentioned constants (step S603).

Then, the sizes of the instructions which use the constants are determined based on the determined size of the constants (step S604).

Then, the size of the instruction string of the selected basic block is determined (step S605).

In this way, the size of a constant to be resolved as an address difference in the basic block division code 203 is determined according to the estimation order list 207 and outputs the result as a size resolution code 209.

Specific Operations of the Instruction String Optimization Apparatus

The operations of characteristic components of the present instruction string optimization apparatus will be described below with respect to a specific instruction string.

EXAMPLE

FIG. 7 is an example of a serial assembler code 201 output from a compiler and shows one function. While the in-function addresses of instructions are shown on the left of that instruction for readability, this address differs from their real addresses at run time on the processor. In this example, the area occupied by one instruction is two bytes. Specific operations of the instruction string optimization apparatus when this code is input to the apparatus will be described in detail on a means-by-means basis.
(Code Dividing Means 202)

The serial assembler code 201 shown in FIG. 7 is input to the Code dividing means 202, its instruction string is divided into basic blocks and output as a basic block division code 203 as shown in FIG. 8. Since the process is the same as the basic block division process by a conventional instruction string optimization apparatus, the detailed description of which is omitted herein.
(Size Dependence Relation Generation Means 204)

The basic block division code 203 shown in FIG. 8 is input to the size dependence relation generation means 204, dependence relations among the basic blocks are analyzed, then the result is output as a size dependence graph 205, as described below.

First, the code shown in FIG. 8 is searched for constants other than displacements of relative branch instructions and it is determined that such a constant does not exist in the code (step S401).

Figure 9A:
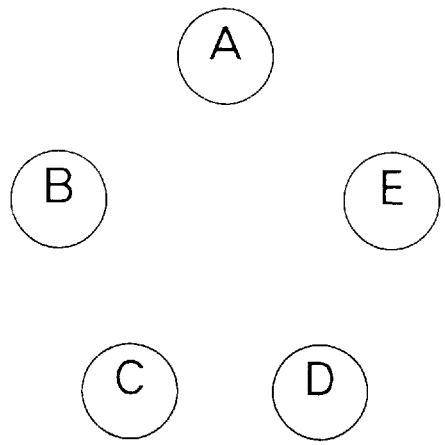
FIGS. 9a through 9c show size dependence graphs 205 generated as the basic block division code 203 shown in FIG. 8 is input to the size dependence relation generation means 204.

Then, nodes corresponding to the basic blocks are generated as shown in FIG. 9a (step S402).

Then, basic block A is selected (step S403) to determine whether there is a displacement of a relative branch instruction in basic block A, and it is determined that label LD is contained in an instruction 804 in FIG. 8 (step S404).

Figure 9B:
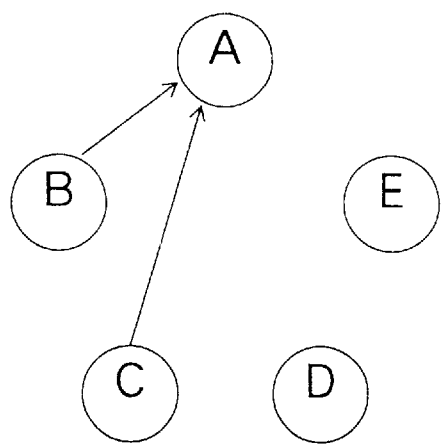

Since the instruction 804 is a branch to label LD at the beginning of basic block D, the value of label LD in the instruction 804 varies depending on the size of instruction strings of basic blocks B and C. Therefore, basic block A is dependent on the two basic blocks, B and C, and directed edges are drawn from nodes B, C to node A as shown in FIG. 9*b* (step S405).

Similarly, steps S403 and S404 are repeated for all the basic blocks to determine depended basic blocks. Thus it is determined that basic block B is dependent on basic blocks C and D, basic block D is dependent on blocks C and D, and basic blocks C and E are not dependent on any of the basic blocks. In this way, a dependence graph 205 as shown in FIG. 9*c* is created.

(Estimation Order Determining Means 206)

The estimation order determining means 206 determines, based on the size dependence graph 205 in FIG. 9*c*, the order of the basic blocks in which displacements of relative branch instructions is determined and outputs an estimation order list 207, as follows.

Figure 9C:
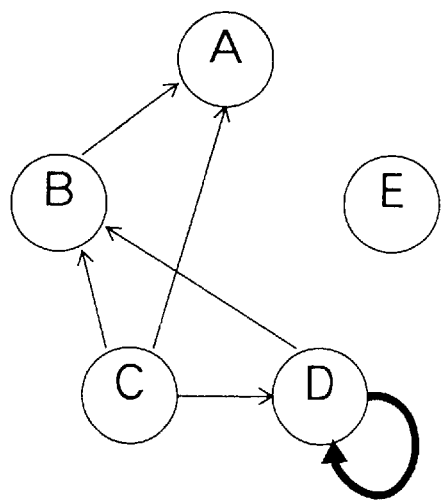

First, the size dependence graph in FIG. 9*c* is checked for a directed edge incoming from one node to itself indicating a self-dependence relation and a directed edge which indicates dependence of node D on D is found. This directed edge is removed from the graph to generate a graph as shown in FIG. 10*a* (step S501).

Figure 10A:
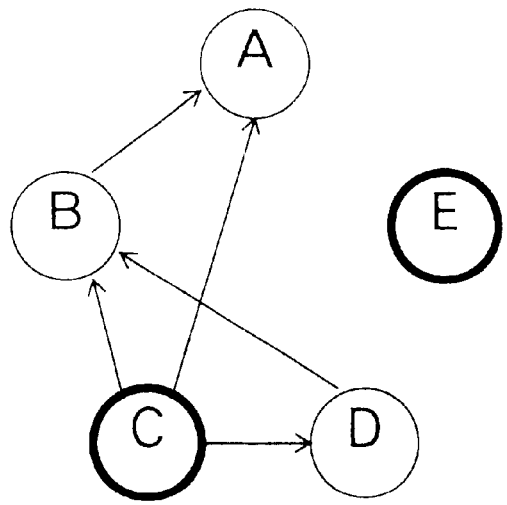
FIGS. 10a through 10c show size dependence graphs (10a, 10b) analyzed as the size dependence graph 205 shown in FIG. 9c is input to the estimation order determining means 206 and an output estimation order list 207 (10c)

Then, this size dependence graph is checked for a node to which no directed edge comes and nodes C and E, which are indicated by a circle with a bold outline in FIG. 10*a*, are found to be such nodes (step S502).

Then, node C out of nodes C and E is selected (step S503).

Figure 10B:
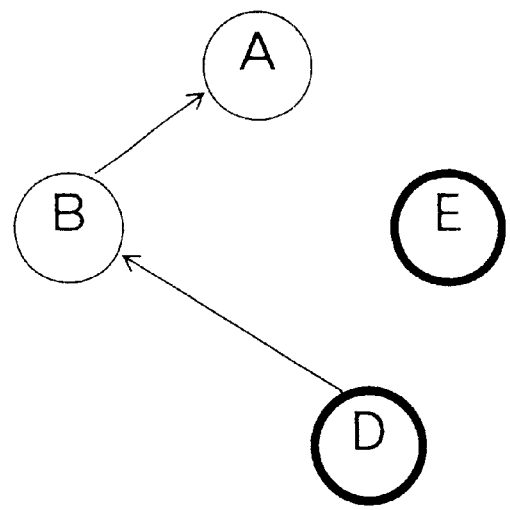

Then, node C and all the directed edges from node C (C→A, C→B, C→D) are removed from the graph (step S504). As a result, the size dependence graph as shown in FIG. 10*b* is generated (the nest node which can be selected are indicated by a circle with a bold outline).

Next, basic block C corresponding to the selected node is appended to the end of the estimation order list (at this point, since the list contains no entry yet, it appears at the top of the list) (step S505).

Steps S503 through S505 are repeated and basic blocks corresponding to selected nodes are appended to the list in sequence until no node remains in the graph 205 to which no directed edge comes.

Figure 10C:
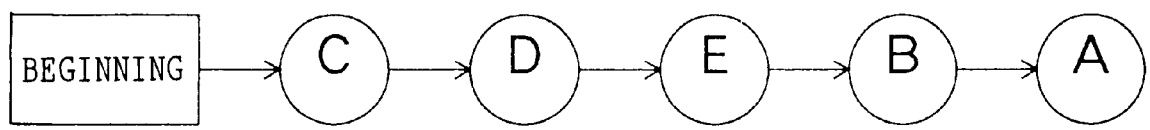

As a result, an estimation order list 207 as shown in FIG. 10*c* is generated which indicates the order, C-E-D-B-A.

(Size Determining Means 208)

The size determining means 208 determines the size of a displacement of the relative branch instruction in each basic block in the basic block division code 203 shown in FIG. 8 according to the estimation order list 207 shown in FIG. 10*c* and outputs the result as a size resolution code 209, as described below.

First, basic block C at the top of the estimation order list 207 shown in FIG. 10*c* is selected (step S601).

It is determined whether basic block C is dependent on a basic block, and no such basic block is found (step S602).

The size of the instruction string of basic block C is determined to be two bytes (step S605).

Then, basic block D is selected according to the estimation order list 207 (step S601).

Basic block D is dependent on basic blocks C and D (step S602). Since depended part of basic block D is only the part of the instruction 812, the size of the depended part is two bytes. The size of the instruction string of basic block C is also two bytes. Thus, the value of label LC in the branch instruction 813 is "−4" (in two's complement notation, a binary digit "0b11100") and can be represented by not more than five bits (step S603).

Since the instruction 813 can be represented by a short instruction, the size of the instruction 813 is determined to be two bytes (step S604).

The size of the instruction string of basic block D is determined to be four bytes (step S605).

Next, basic block E is selected to perform a similar process and it is found that the basic block E is dependent on no basic block, therefore the size of the basic block E is determined to be two bytes.

Basic block B is selected to perform a similar process and the value of label LE in the instruction 810 is determined to be "8" (0b01000 in binary notation). Since the instruction 810 can be represented by a short instruction, its size is determined to be two bytes and the size of the instruction string of basic block B is determined to be 12 bytes.

Finally, basic block A is selected to perform a similar process and the value of label LD in the instruction 804 is determined to be "16" (in hexadecimal notation, 0×0010) and cannot be represented by not more than five bits. Thus, the instruction 804 is a long instruction of four bytes. Accordingly the value of label LD is changed to "18" (in hexadecimal notation, 0×0012). Thus, the size of basic block A is 10 bytes.

The size resolution code 209 in which displacements of the relative branch instruction are determined in this way is shown in FIG. 11. Because the size of the instruction 1104 is determined to be four bytes, the in-function address shown to the left of the instruction is changed accordingly, According to the embodiment described above, for an instruction which does not provide a cyclic size dependence relation, the size of a constant to be resolved as an address difference can be accurately estimated, and thus the number of codes are reduced and process speed of a linker is increased.

Embodiment 2

While the first embodiment applies to the case where the size dependence graph created contains no cyclic dependence relation, a second embodiment of the present instruction string optimization apparatus applies to the case where the size dependence graph created contains a cyclic dependence relation, as well.

Processor Used with the Second Embodiment

It is assumed that the processor used with the second embodiment is the same as the processor used with the first embodiment.

Configuration of the Instruction String Optimization Apparatus of the Second Embodiment The configuration of the instruction string optimization apparatus of the second embodiment is the same as that of the first embodiment shown in FIG. 2, except for the operations of the estimation order determining means 206 and the size determining means 208, which will be described below.

(Estimation Order Determining Means 206)

The estimation order determining means 206 determines, based on a size dependence graph 205 provided by size dependence relation generation means 204, the order of basic blocks in which a constant to be resolved as an address difference is determined and outputs an estimation order list is 207.

Figure 12:
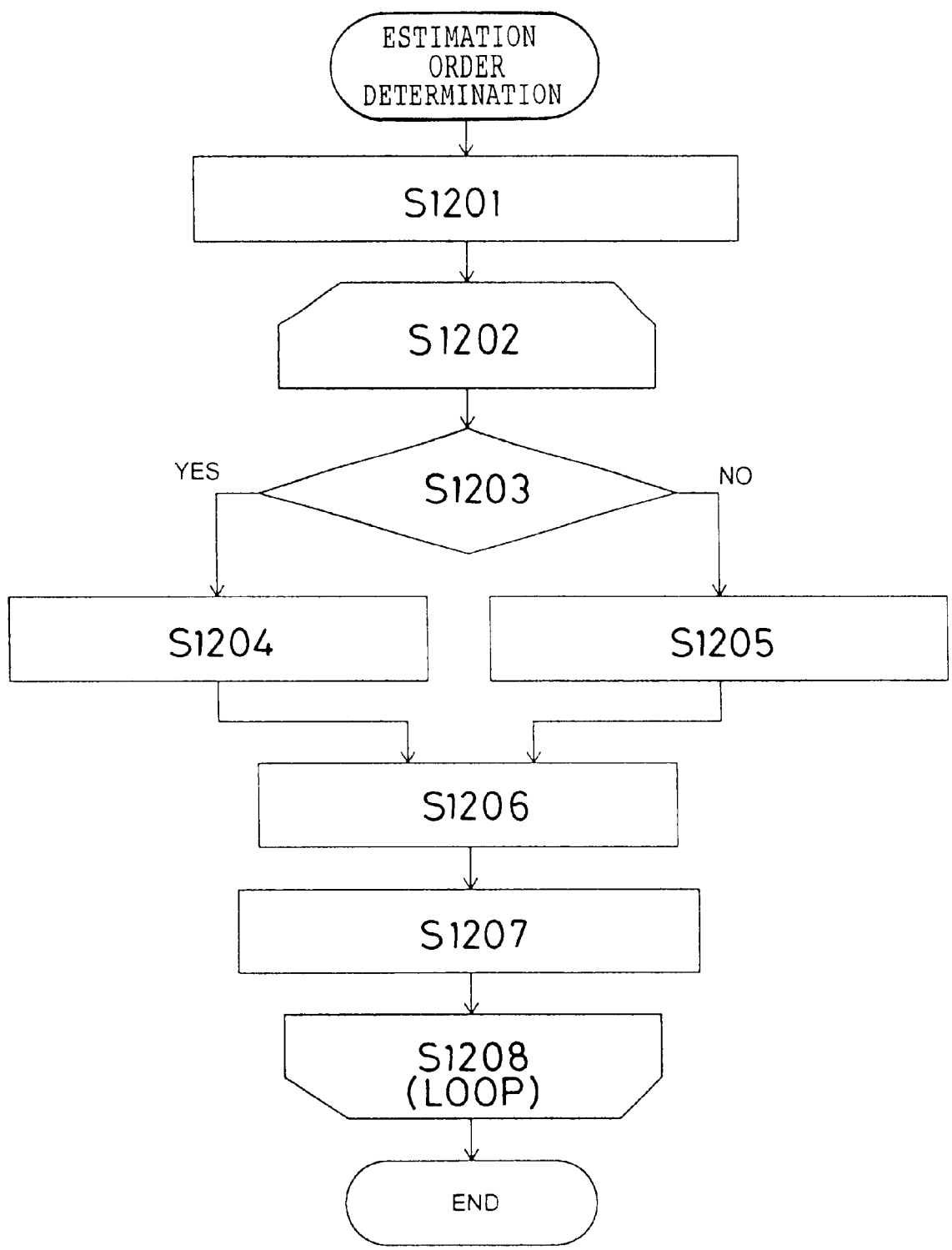
FIG. 12 shows a flowchart of a process performed in the estimation order determining means 206.

FIG. 12 shows a flowchart of a process performed in the estimation order determining means 206.

First, all directed edges incoming from one node to itself which indicate a self-dependence relation from in the size dependence graph 205 are removed (step S1201).

The following process (steps S1203 through S1207) is repeated until no node remains in the size dependence graph 205 to create an estimation order list 207 (step S1202).

It is determined whether the size dependence graph 205 contains a node to which no directed edge comes (step S1203).

If yes, any one node of the nodes is selected (step S1204).

If no, a node which has the fewest incoming directed edges is selected and remove the incoming directed edges (step S1205).

Then, the selected node and all of its outgoing directed edges are removed from the size dependence graph 205 (step S1206).

Then, a basic block corresponding to the selected node is appended to the end of the estimation order list 207 (step S1207).

In this way, the estimation order list 207 is generated by determining the order in which basic blocks are estimated based on the size dependence graph 205. The estimation order list 207 contains the basic block indicating the node in which a circle is created on the size dependence graph.

(Size Determining Means 208)

The size determining means 208 determines the size of a constant to be resolved as an address difference in each of basic blocks in a basic block division code 203 provided by code dividing means 202, in the order of basic blocks indicated by the estimation order list 207 provided by the estimation order determining means 206, and outputs the result as a size resolution code 209.

Figure 13:
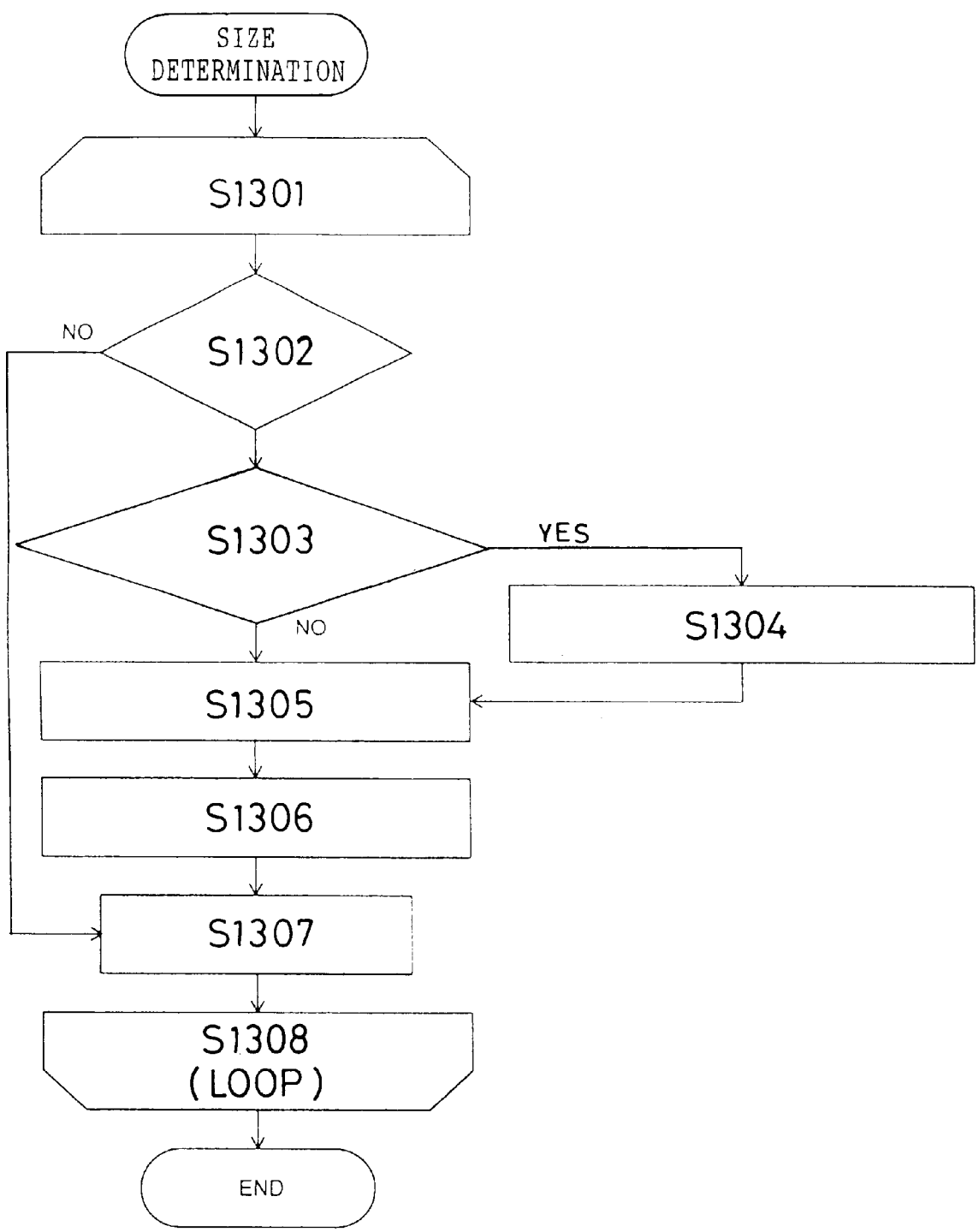
FIG. 13 shows a flowchart of a process performed in the size determining means 208.

FIG. 13 shows a flowchart of a process performed in the size determining means 208.

Basic blocks are selected from the estimation order list one at a time from the top to the bottom according to the estimation order list 207 and the following process (steps S1302 through S1307) is repeated until all the basic blocks are selected to determine the sizes of constants to be resolved as an address difference (step S1301).

First, it is determined whether the selected basic block is dependent on a basic block (step S1302). If no, the process proceeds to step S1307.

If yes, it is determined whether an unresolved basic block whose instruction string size is not determined exists among the depended basic blocks (step S1303). If no, the process proceeds to step S1305.

If yes, the size of the constant of the unresolved basic block is assumed as the maximum value and the size of the instruction string of the unresolved basic block is calculated (step S1304).

Now that the sizes of the instruction strings of all the depended basic blocks are determined, the sum of the sizes is calculated to determine the size of the constant (step S1305).

Then, according to the determined size of the constant, the size of an instruction which uses that constant is determined (step S1306).

Then, the size of the instruction string of the selected basic block is determined (step S1307).

In this way, the sizes of constants to be resolved as address differences in the basic block division code 203 are determined according to the estimation order list 207 and output as a size resolution code 209.

Operations of the Instruction String Optimization Apparatus

Operations of characteristic components of the present instruction string optimization apparatus will be described below with respect to a specific instruction string.

EXAMPLE

FIG. 14 shows an example of a basic block division code 203 output by code dividing means 202. The operation of the size dependence relation generation means 204 when this code is input to it will be described below.

(Size Dependence Relation Generation Means 204)

The size dependence relation generation means 204 analyzes dependence relations among basic blocks in a basic block division code 203 as shown in FIG. 14 and outputs the result as a size dependence graph 205.

Figure 15A:
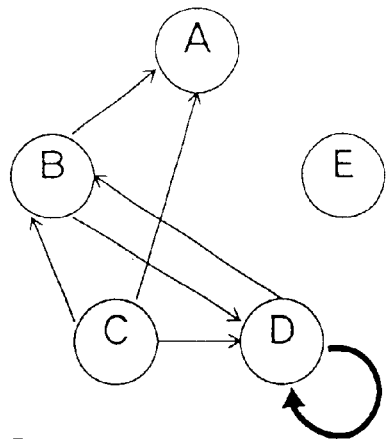
FIGS. 15a through 15f show size dependence graphs 205 generated when the basic block division code 203 in FIG. 14 is input to the size dependence relation generation means 204 and analyzed in the estimation order determining means 206.

An size dependence graph 205 as shown in FIG. 15a is generated by performing operations similar to those described with respect to the first embodiment.

(Estimation Order Determining Means 206)

The estimation order determining means 206 determines the order of basic blocks in which a displacement of a relative branch instruction is determined based on the size dependence graph 205 shown in FIG. 15a and outputs an estimation order list 207, as described below.

Figure 15B:
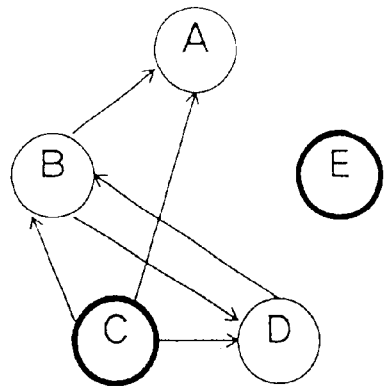

First, directed edges indicating a self-dependence relation from one node to itself (D→D) (represented by a bold line in FIG. 15a) in the size dependence graph shown in FIG. 15a are removed to generate a graph as shown in FIG. 15b (step S1201).

The following process (steps S1203 through S1207) is repeated until no node remains in the size dependence graph to generate an estimation order list (step S1202).

It is determined whether a node exists in the graph which has no incoming directed edge and nodes C and E are found to be such nodes (step S1203).

Node C is selected out of node C and E (step S1204).

Figure 15C:
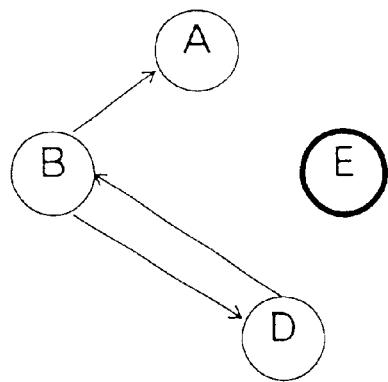

Then, the node C and all the directed edges going out from node C are removed from the size dependence graph to generate a graph as shown in FIG. 15c.

Then, the basic block C is appended to the end of the estimation order list (step S1207).

Figure 15D:
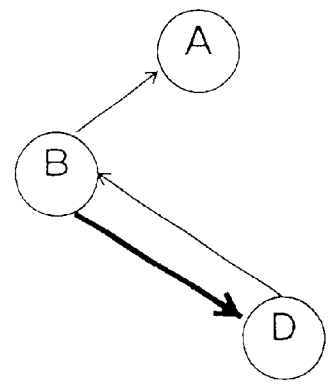

Since nodes are remain in the graph shown in FIG. 15c (step S1202), steps S1203 to S1207 are performed similarly and node E, which has no incoming directed edge, is selected and removed from the graph to generate a graph as shown in FIG. 15d.

Figure 15E:
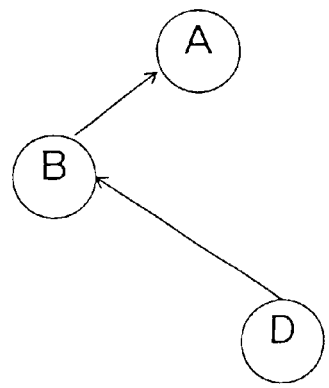

It is found that nodes remain in the graph shown in FIG. 15d (step S1202) and there is no node which has no incoming directed edge (step S1203). Therefore, it is tried to find a node having the fewest incoming directed edges and it is found that all of the remaining nodes A, B, and D have one incoming directed edge. One of the nodes, in this example node D, is selected and its incoming directed edge (represented by a bold line in FIG. 15d) is removed to generate a graph as shown in FIG. 15e (step S1205).

Figure 15F:
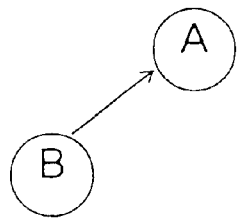

Then, node D and its outgoing directed edge is removed to generate a graph as shown in FIG. 15f (step S1206).

Finally, basic block D is appended to the end of the estimation order list (step S1207).

Figure 16:
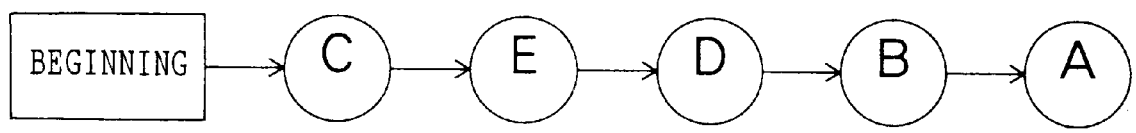
FIG. 16 shows an estimation order list 207 which is output when the size dependence graph 205 in FIG. 15a is input to the estimation order determining means 206.

By selecting further basic blocks, performing the above-mentioned steps, and adding the basic blocks to the estimation order list in this way, the estimation order list 207 which indicates the order, C-E-D-B-A, is generated as shown in FIG. 16.

(Size Determining Means 208)

The size determining means 208 determines the size of a displacement of the relative branch instruction in each basic block in the basic block division code 203 shown in FIG. 14 according to the estimation order list 207 shown in FIG. 16 and outputs the result as a size resolution code 209.

First, basic block C at the top of the estimation order list 207 shown in FIG. 16 is selected (step S1301).

It is determined whether basic block C is dependent on a basic block, and no such basic block is found (step S1302).

Then, the size of the instruction string of basic block C is determined to be two bytes (step S1307).

Similarly, basic block E is selected according to the estimation order list 207 and the size of the instruction string of basic block E is also determined to be two bytes.

Then, basic block D is selected according to the estimation order list 207 (step S1301).

It is found that basic block D is dependent on basic blocks B, C, and D (step S1302). Therefore, it is determined whether an unresolved basic block whose instruction string size is not determined exists among basic blocks B, C, and D. Because the size of basic block C is two bytes and basic block D is self-dependent on itself, the size of the instruction string in existing basic block D is determined to be two bytes, which is the size of the instruction string excluding instruction 1413. However, it is found that there is an unresolved basic block because the size of the instruction string of basic block B is not determined (step S1303).

Then, by estimating the size of a constant LE in branch instruction 1410 in unresolved basic block B to be the maximum value used in the processor, the size of instruction 1410 is determined to be four bytes and therefore the size of the instruction string of basic block B is determined to be 14 bytes (step S1304).

Then, by summing all the sizes of the depended basic blocks B, C, and D (excluding the size of instruction 1413) 18 bytes is yielded and thus the value of a constant LB in instruction 1413 is obtained as "−18", (in hexadecimal notation, 0xffee) (step S1305).

Because the constant LB cannot be represented with five bits or less, instruction 1413 is a long instruction of four bytes (step S1306).

Thus, the size of the instruction string of basic block D is obtained as six bytes (step S1307).

Similarly, in basic block B, the value of label LE in instruction 1410 is obtained as "12" (in binary notation, 0b01100) and can be represented by no more than five bits. However, instruction 1410 has been already determined to be a long instruction. Similarly, in basic block A, the value of label LD in instruction 1404 is obtained as "18" (in hexadecimal notation, 0x0012) and thus instruction 1404 is determined to be a long instruction.

Figure 17:
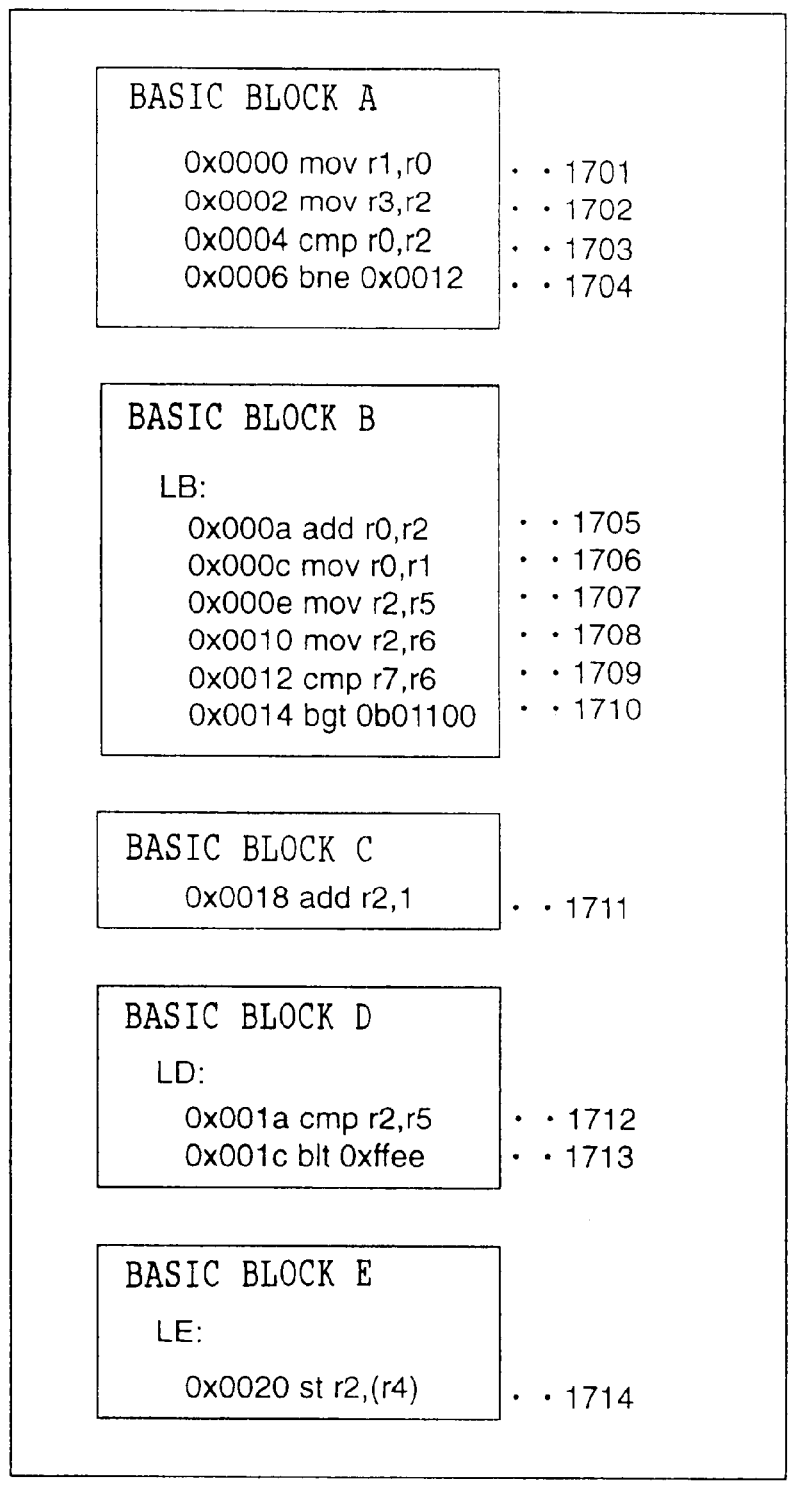
FIG. 17 shows a size resolution code 209 which is output when the basic block division code 203 in FIG. 14 and the estimation order list 207 in FIG. 16 are input to the size determining means 208.

The size resolution code provided by determining the sizes of constants and branch instructions in this way is shown in FIG. 17.

According to the second embodiment described above, in a case for the instruction string creating a circle in size dependence relation the size of a constant to be resolved as an address difference can be estimated so as to be a value close to and not less than its actual size, thus the number of codes can be reduced and the process speed by a linker can be improved.

Third Embodiment

A third embodiment of the instruction string optimization apparatus applies, like the second embodiment, to a case where a size dependence graph created may or may not contain a cyclic dependence relation. However, the sizes of constants are resolved in a different way from the second embodiment.

Processor Used With the Third Embodiment

It is assumed that the processor used with the third embodiment is the same as the processor used with the first embodiment.

Figure 18:
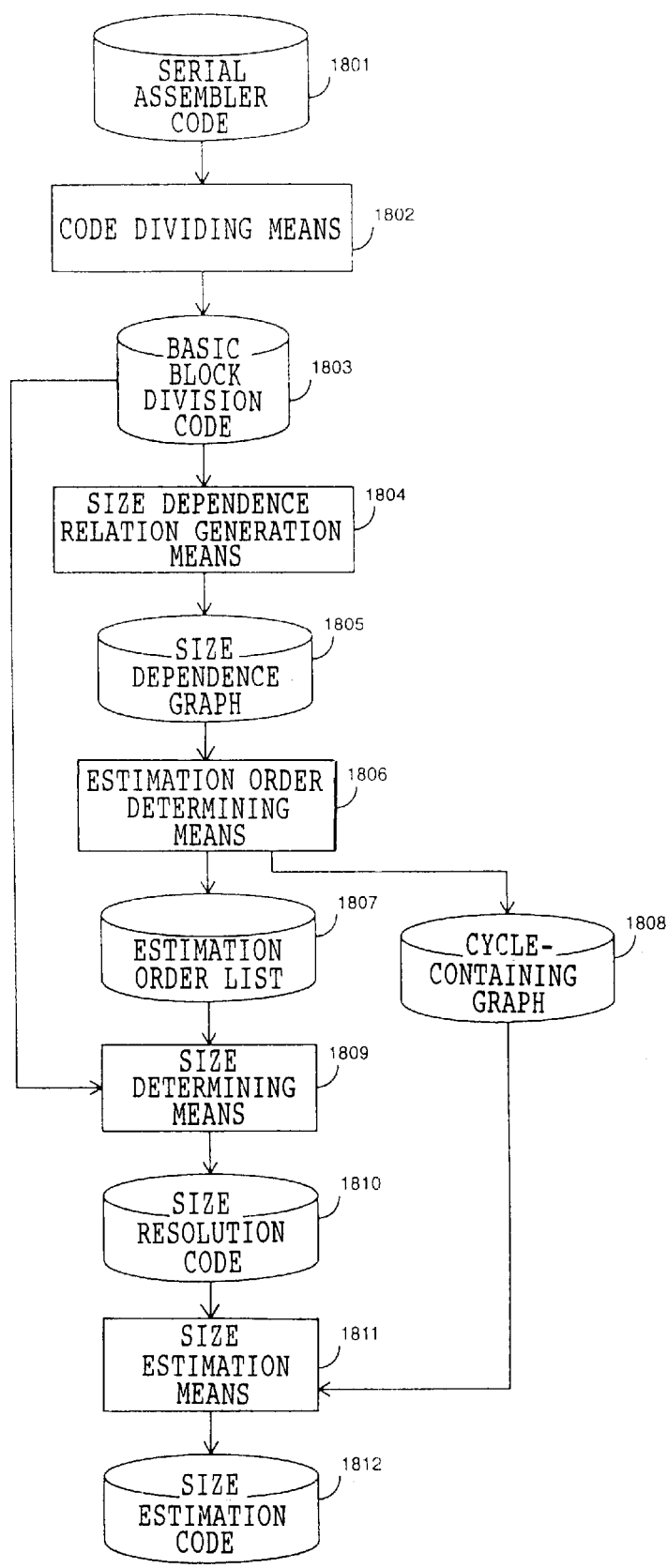
FIG. 18 shows a block diagram of a configuration and input/output data of an instruction string optimization apparatus.

Configuration of the Instruction String Optimization Apparatus of the Third Embodiment FIG. 18 shows a configuration of the instruction string optimization apparatus according to the third embodiment.

The instruction string optimization apparatus accepts a serial assembler code 1801 output from a compiler and determines the sizes of constants to be resolved as an address difference to output a size estimation code 1812, as described below.

First, code dividing means 1802 divides the serial assembler code 1801 into basic blocks and outputs the result as a basic block division code 1803. Then, size dependence relation generation means 1804 analyzes size dependence relations of the instruction string among the basic blocks and outputs the result as a size dependence graph 1805. Based on the size dependence graph 1805, estimation order determining means 1806 determines the order of the basic blocks in which the sizes of the constants are determined, outputs the order as an estimation order list 1807, and leaves basic blocks whose order cannot be determined in a graph containing a cyclic relation 1808. Size determining means 1809 determines the size of the constant in each basic block in the basic block division code 1803 and outputs the result as a size resolution code 1810, according to the order indicated in the estimation order list 1807. Then, size estimation means 1811 analyzes the graph containing a cyclic relation 1808 to determine the size of an unresolved constant in the size resolution code 1810 and outputs the result as a size estimation code 1812.

Each of these means will be described in detail below.

(Code Dividing Means 1802)

The code dividing means 1802, like the code dividing means 202 of the first embodiment, reads a serial assembler code 1801 and outputs a basic block division code 1803.

(Size Dependence Relation Generation Means 1804)

The size dependence relation generation means 1804, like the size dependence relation generation means 204 of the first embodiment, analyzes size dependence relations among the instruction strings of basic blocks in the basic block division code 1803 provided by the code dividing means 1802 and outputs the results as a size dependence graph 1805.

(Estimation Order Determining Means 1806)

The estimation order determining means 1806, like the estimation order determining means 206, determines, based on the size dependence graph 1805 provided by the size dependence relation generation means 1804, the order of the basic blocks in which constants to be resolved as address differences are determined and outputs the result as an estimation order list 1807. The flowchart of a process performed in the estimation order determining means 1806 is the same as FIG. 5 of the first embodiment, except that nodes having an incoming directed edge may remain in a dependence graph because the third embodiment may also apply to a case where the dependence graph contains a cyclic relation. In such a case, the graph in which nodes remain is output as the cycle-containing graph 1808.

(Size Determining Means 1809)

The size determining means 1809, like the size determining means 208 of the first embodiment, determines the size of a constant to be resolved as an address difference in each basic block in the basic block division code 1803 provided by the code dividing means 1802, following the order of the basic blocks indicated by the estimation order list 1807 provided by the estimation order determining means 1806, and outputs the result as a size resolution code 1810.

(Size Estimation Means 1811)

The size estimation means 1811 analyzes the cycle-containing graph 1808 provided by the estimation order determining means 1806 to determine the size of unresolved constants in the size resolution code 1810 provided by the size determining means 1809, and outputs the result as a size estimation code 1812.

Nodes contained in the cycle-containing graph 1808 are those nodes which constitute a cycle or those nodes which are dependent on a node constituting a cycle. Therefore, constant sizes in all the basic blocks can be determined by determining the size of unresolved constants in basic blocks corresponding to the nodes constituting a cycle. In addition, as for a basic block corresponding to each node in a group of nodes constituting one cycle, as its dependence relation indicates, the sizes of unresolved constants in all the basic blocks corresponding to the nodes in that cycle can be determined by determining unresolved constant sizes in a basic block corresponding to one node. Therefore, any one of the nodes is selected, the minimum size used in a particular processor is assumed as the size of an unresolved constant in a basic block corresponding to the node, and, for all the nodes constituting the cycle, unresolved constants in each basic block corresponding to each of the nodes are determined. Then, based on all the determined constants, the sizes of the constants are re-evaluated and, if there is any inconsistency in the values, the inconsistency is corrected. The process is repeated until the sizes converge without any inconsistency.

In this way, the sizes of unresolved constants in the basic blocks corresponding to the nodes in the cycle-containing graph 1808 is determined.

Figure 19:
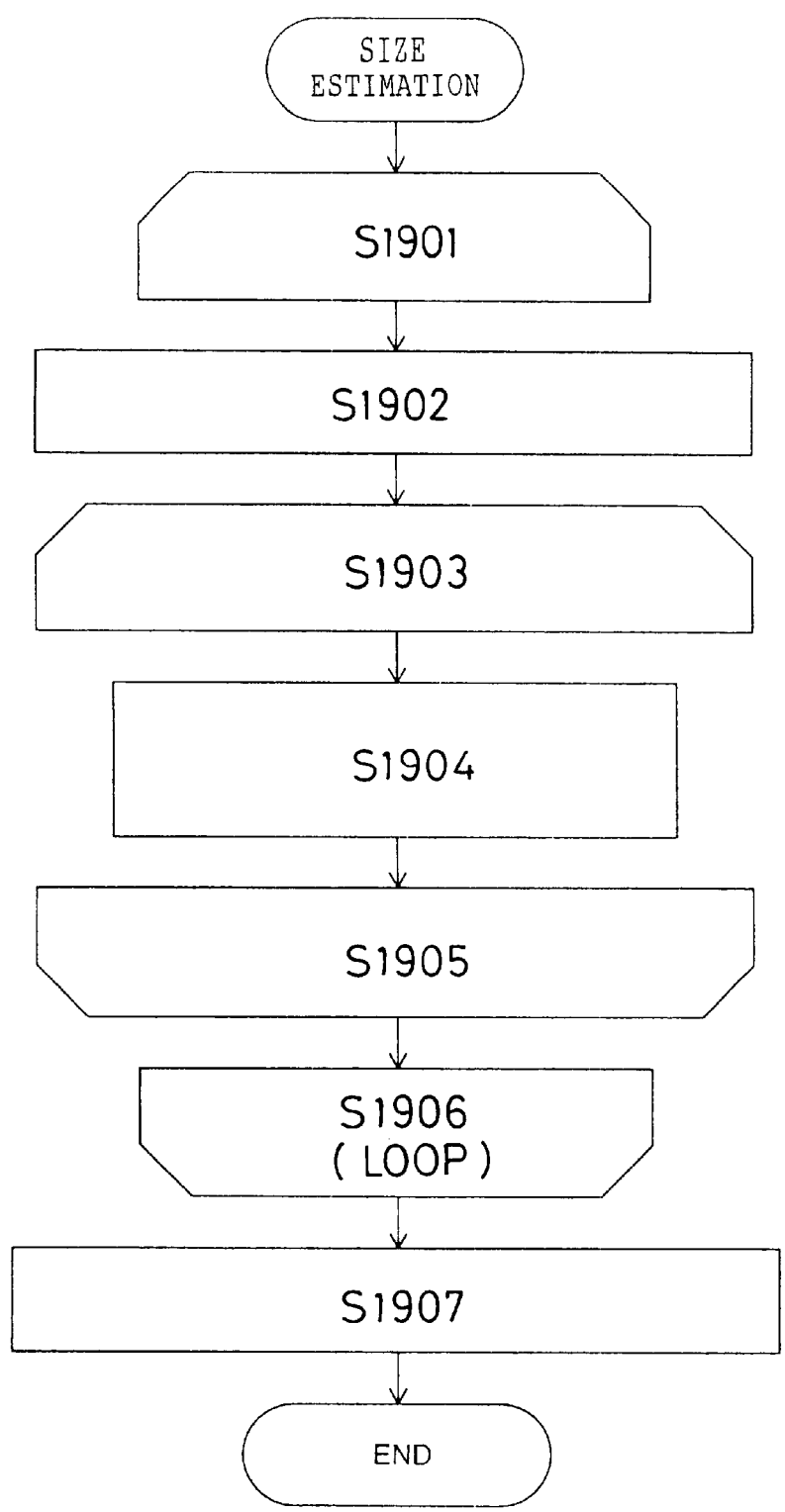
FIG. 19 shows a flowchart of a process performed in size estimation means 1811.

FIG. 19 shows a flowchart of a process performed in the size estimation means 1811.

The following process (steps S1902 through S1905) is repeated for each node in a group of nodes constituting a cycle in the cycle-containing graph 1808 (step S1901).

First, any one node in the node group under consideration is selected and the minimum value used in a purposed processor is assumed as the size of an unresolved constant in a basic block corresponding to the node to calculate the size of the instruction string of the basic block (step S1902).

Then, the following process (step S1904) is repeated until inconsistency in the sizes of constants in the basic blocks corresponding to the nodes in the node group is eliminated and the values of the constants converge (step S1903).

The value of a constant in a basic block which is dependent on a basic block whose constant size has been changed is determined and the size of the instruction string of the basic block is also determined (step S1904).

In this way, the determination of the sizes of constants is repeated until inconsistency in the sizes of the constants is eliminated and the values converge for all the nodes in the group of nodes constituting a cycle in the cycle-containing graph.

For unresolved sizes in basic blocks corresponding to nodes which do not constitute a cycle, values of the constants and the sizes of instruction strings of the basic blocks are determined in sequence as the size of a block on which each of the basic blocks is dependent is determined (step S1907).

A size estimation code 1812 in which all the constant values and the sizes of basic blocks are determined in this way is output.

Specific Operations of the Instruction String Optimization Apparatus

Operations of characteristic components of the instruction string optimization apparatus will be described below with respect to a specific instruction string.

EXAMPLE

The code shown in FIG. 14 used in the second embodiment is used as an example of a basic block division code 1803 output from the code dividing means 1802. Operations of the code dividing means 1802 are the same as in conventional basic block division technologies and therefore the description of which is omitted.

The operations of the size dependence relation generation means 1804 when this basic block division code 1803 is input to it are the same as those of the size dependence relation generation means 204 in the second embodiment and the size dependence graph 1805 as shown in FIG. 15*a* is generated. Operations after this generation will be described below in detail.

(Estimation Order Determining Means 1806)

In the estimation order determining means 1806 a directed edge (D→D) which indicates a self-dependence relation in the size dependence graph 1805 shown in FIG. 15*a* is removed and nodes C and E which have no incoming directed edge and all the directed edges outgoing from nodes C and E are removed to generate a graph shown in FIG. 15*d*. Because there is no node which has an incoming edge, the analysis ends at this point and an estimation order list 1807 shown in FIG. 20 which indicates the order in which nodes are removed and a cycle-containing graph 1808 shown in FIG. 15*d* are output.

(Size Determining Means 1809)

Figure 20:
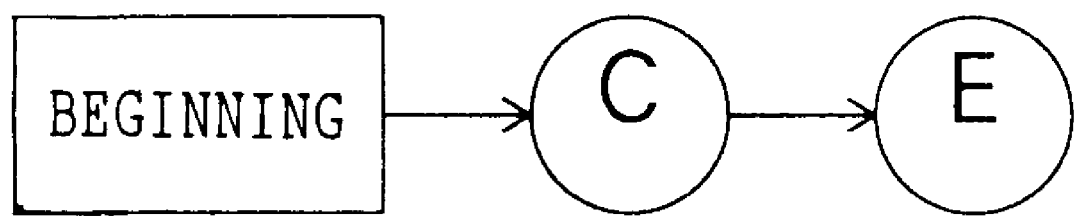
FIG. 20 shows an estimation order list 1807 which is output when the size dependence graph 1805 in FIG. 15a is input to the estimation order determining means 1806.

The size determining means 1809 determines the size of a displacement of a relative branch instruction in each basic block in a basic block division code 1803 shown in FIG. 14 and outputs the result as a size resolution code 1810 according to the order of the estimation order list 1807 shown in FIG. 20. The third embodiment differs from the second embodiment in that the sizes of the displacements determined in the size resolution code 209 output at this point are only the sizes of displacements in basic blocks contained in the estimation order list 1807 and the sizes of displacement of other basic blocks are determined in the size estimation means 1811.

Here, basic blocks C and E are selected according to the estimation order list 1807 and the size of their instruction strings is determined. The size of the both instruction strings is determined to be two bytes and a size resolution code 1810 shown in FIG. 21 is output. In FIG. 21, the size of basic blocks A, B, and D is unresolved.

(Size Estimation Means 1811)

The size estimation means 1811 analyzes the cycle-containing graph 1808 shown in FIG. 15*d* which is provided by the estimation order determining means 1806, determines the size of displacements and the size of the instruction strings of the branch instruction of unresolved basic blocks A, B, and D in the size resolution code 1810 shown in FIG. 21 provided by the size determining means 1809, and outputs the results as a size estimation code 1812, as follows.

First, it is determined whether there is a group of nodes comprising a cycle in the cycle-containing graph 1808 in FIG. 15*d* and it is found that node group {B, D} constitutes a cycle (B→D→B) (step S1901).

Then, the size of a constant LE of a branch instruction 2110 in a basic block corresponding to node B in node group {B, D} is assumed to be five bits, which is the minimum size used in the processor.

Thus, it is determined that the instruction 2110 is a short instruction and its size is two bytes (step S1902).

Next, the calculation of constant sizes and instruction string sizes of basic blocks of node group {B, D} is repeated until inconsistency in the constant sizes in the basic blocks is eliminated and the values converge (step S1903).

Since the size of a constant LB in a relative branch instruction in basic block B is provided, a constant LB in a relative branch instruction 2113 in basic block D is calculated to provide a result "−16" (in hexadecimal notation, 0xfff0). Because this value can be represented by not more than five bits, the size of the relative branch instruction 2113 is two bytes and the size of instruction string of basic block D is four bytes (step S1904).

Since the size of basic block D is provided, the value of the constant LE in the relative branch instruction 2110 in the basic block B is calculated again to provide a result "8" (in binary notation, 0b01000). Because this value can be represented by not more than five bits, the size of the relative branch instruction 2110 is two bytes and the size of the instruction string of basic block B is 12 bytes (step S1904).

At this point, the size of the instruction 2110 becomes the same as the size initially assumed. Therefore, the sizes of constants in basic blocks B and D converge and the loop from step S1903 to S1005 ends.

Because there is no node group other than the node group {B, D} in the cycle-containing graph 1808 shown in FIG. 15d, the loop from step S1901 to S1906 also ends.

Then, the value of a constant of a branch instruction and the size of the instruction string of basic block A which does not constitute a cycle in the cycle-containing graph 1808 shown in FIG. 15d are determined (step S1907).

Thus, the size estimation code 1812 shown in FIG. 22 is provided.

According to the third embodiment described above, the size of a constant to be resolved as an address difference can be estimated accurately even if an instruction string provides a cyclic size dependence relation, thus the number of codes is reduced and processor speed of a linker increases.

Fourth Embodiment

Processor Used with Fourth Embodiment (Architecture)

The processor used with a fourth embodiment is a VLIW processor which executes 32-bit fixed-length VLIW instructions and can execute up to two instructions concurrently. The processor includes components which conventional VLIW processors include, such as instruction memory, a program counter, an instruction fetch circuit, an instruction register, a general-purpose register, data memory, a buss for transmitting data and addresses, two instruction decoders, and two arithmetic and logic units which operate concurrently.

FIG. 23 shows two formats (a short-instruction format and a long-instruction format) executed by the ULIW processor of interest.

Figure 23A:
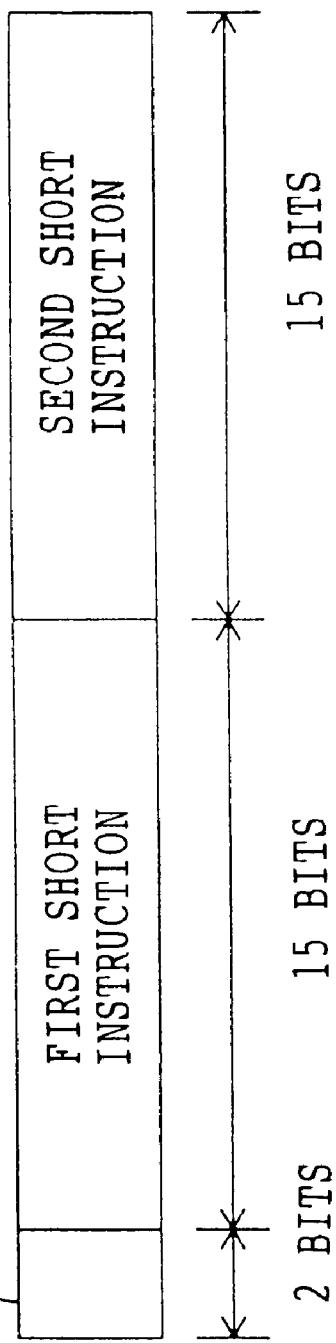
FIGS. 23a and 23b show two types of instruction format executed by a VLIW processor of interest.
Figure 23B:
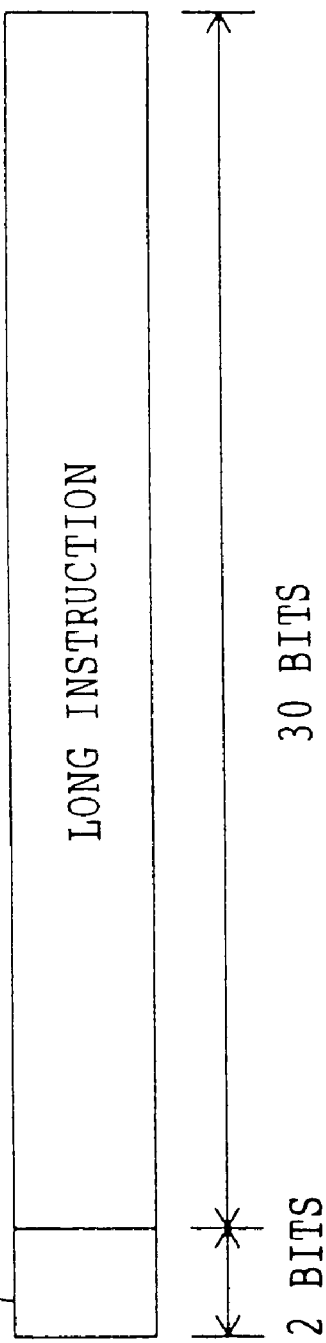

FIG. 23a shows a short-instruction format containing 2-bit format information and two 15-bit short instructions specifying the VLIW format. FIG. 23b shows a long instruction format containing 2-bit format information and one 30-bit long instruction.

Figure 24A:
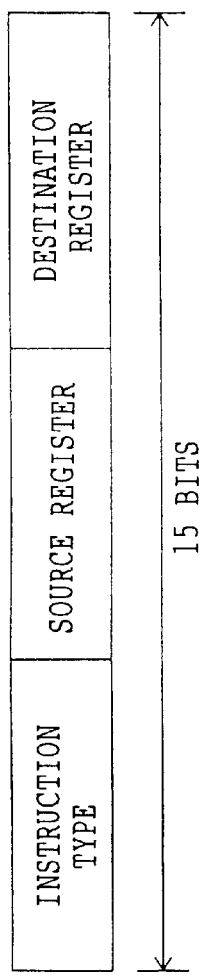
FIGS. 24a through 24c show the formats of short or long instructions shown in FIG. 23.
Figure 24B:
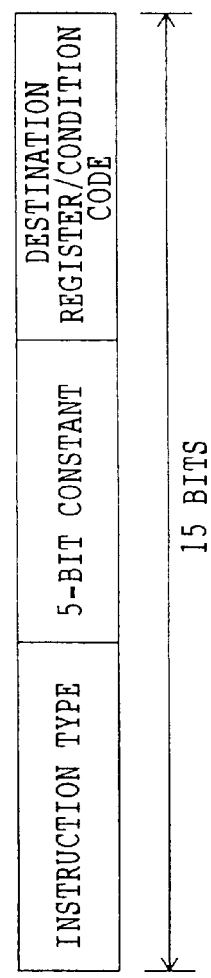
Figure 24C:
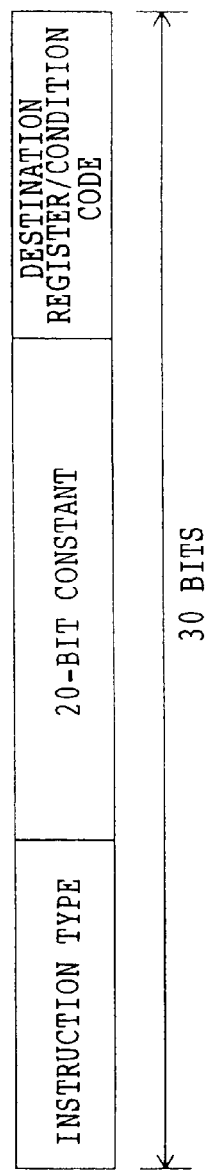

FIG. 24a shows a short instruction of 15 bits for an inter-register operation. FIG. 24b shows a short instruction containing a 5-bit constant and FIG. 24c shows a 30-bit long instruction containing a long constant of 20 bits. The instructions in FIGS. 24b and 24c specify a destination register if the type of the instruction is an operation instruction or a transfer instruction, or specify a branch condition code if the type of the instruction is a branch instruction.

As a branch instruction, a relative branch instruction is used which uses a difference between the address of the long instruction including the branch instruction and the address of the branch target as a constant.

Configuration of the Instruction String Optimization Apparatus of the Fourth Embodiment The configuration of the instruction string optimization apparatus of the fourth embodiment is the same as that of the first embodiment shown in FIG. 2, except for the operations of the size determining means 208, which will be described below.

(Size Determining Means 208)

The size determining means 208 determines the size of a constant to be resolved as an address difference in each of basic blocks in a basic block division code 203 provided by code dividing means 202, in the order of basic blocks indicated by the estimation order list 207 provided by the estimation order determining means 206, transforms the instruction string to the long-word instruction string and outputs the result as a size resolution code 209.

Figure 25:
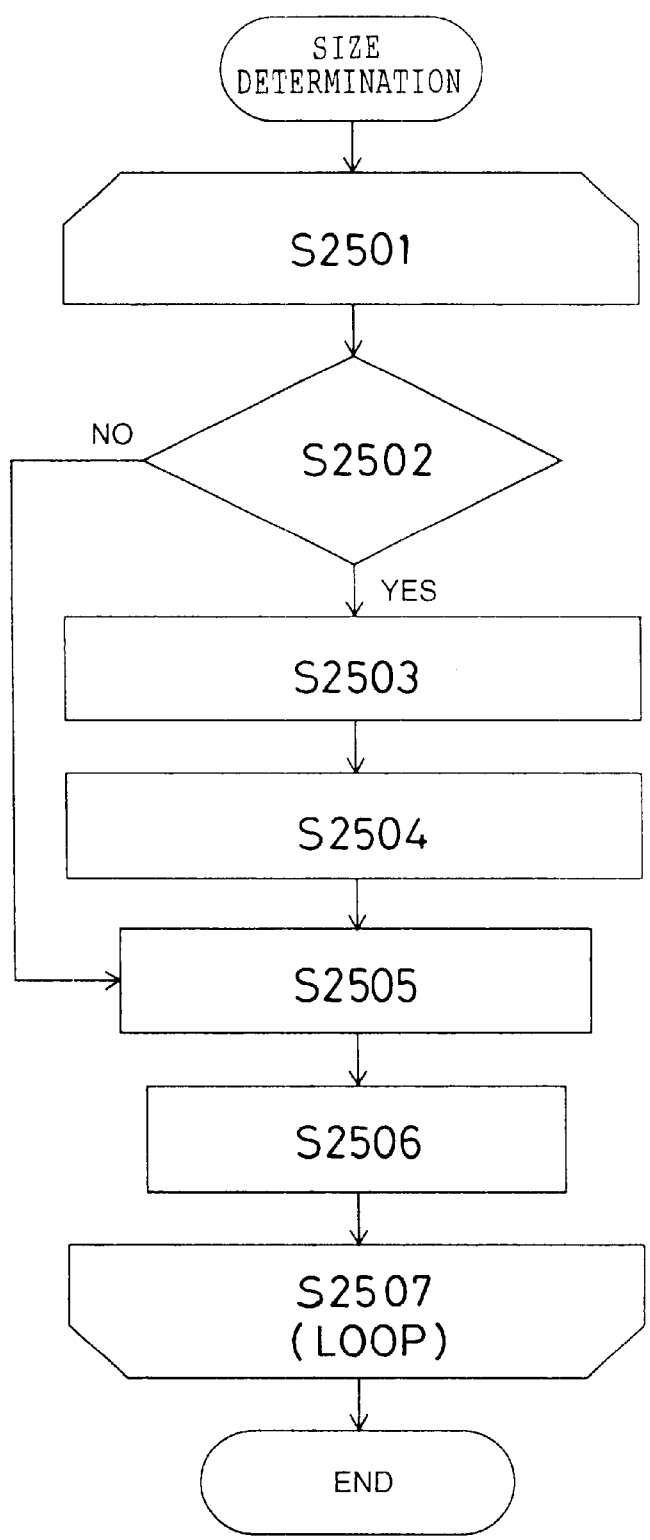
FIG. 25 shows a flowchart of a process performed in the size determining means 206.

FIG. 25 shows a flowchart of a process performed in the size determining means 208.

Basic blocks are selected from the estimation order list 207 one at a time from the top to the bottom and the following process (steps S2502 through S2506) is repeated until all the basic blocks are selected to determine the sizes of constants to be resolved as an address difference (step S2501).

First, it is determined whether the selected basic block is dependent on a basic block (step S2502). If no, the process proceeds to step S2505.

If yes, the sum of the sizes of long-word instruction strings of all the depended basic blocks is calculated to determine the size of the constant (step S2503).

Then, according to the size of the constant, the size of an instruction which uses the constant is determined (step S2504).

Then, the instruction string of the selected basic block is transformed to a long-word instruction string (step S2505).

The size of the long-word instruction string of the selected basic block is further determined (step S2506).

In this way, the size of a constant to be resolved as an address difference in the basic block division code 203 based on the estimation order list 207 is determined and the result is output as a size resolution code 209.

Operations of the Instruction String Optimization Apparatus

Operations of the instruction string optimization apparatus of the fourth embodiment will be described below by using an example of a specific instruction.

EXAMPLE

The serial assembler code 201 shown in FIG. 7 used in the first embodiment is used as an example.

Operations of the code dividing means 202, size dependence relation generation means 204, and estimation order determining means 206 are the same as those in the first embodiment, therefore a detailed description of these operations are omitted.

As the result of the above mentioned operations, a basic block division code 203 shown in FIG. 8 and an estimation order list 207 shown in FIG. 10c have been provided. Detailed operation when it is input to the size determining means 208 will be described below.

(Size Determining Means 208)

The size determining means 208 determines the size of a displacement of the relative branch instruction in each basic block in the basic block division code 203 shown in FIG. 8 according to the estimation order list 207 shown in FIG. 10*c*, transforms the instruction string to a long-word instruction string, and outputs the result as a size resolution code 209.

First, basic block C at the top of the estimation order list 207 shown in FIG. 10*c* is selected (step S2501).

It is determined whether basic block C is dependent on a basic block, and no such basic block is found (step S2502).

The instruction string of basic block C is transformed to an instruction string as shown in FIG. 26*a*. One long-word instruction is described on one line and a symbol "‖" is an instruction delimiter. In this example, one of the two short instructions in the long-word instruction is filled with a no-operation (nop) (step S2505).

Then, the size of the instruction string of basic block C is determined to be four bytes (step S2506).

Next, basic block D is selected according to the estimation order list 207 (step S2501).

Basic block D is dependent on basic blocks C and D (step S2502). In order to calculate the size of the long-word instruction string of basic block D, the instructions are re-arranged assuming that all the instructions in the instruction string are short instructions. As a result, basic block D becomes a long-word instruction string as shown in FIG. 26*b*.

Because basic block D is dependent on only the long word instruction string 2602 part of basic block D, the size of the depended part is four bytes. The size of the long-word instruction string of basic block C is also four bytes. Thus, the value of label LC in the branch instruction 812 is "−8" (in binary notation, 0b11000) and its size is not more than five bits (step S2503).

The size of the instruction string of basic block D is determined to be eight bytes (step S2505).

Next, basic block E is selected and a similar process is performed. Basic block E is not dependent on a basic block and the size of the long-word instruction string of the basic block E is determined to be four bytes (FIG. 26*c*).

Next, basic block B is selected and a similar process is performed. As a result, the value of label LE in the instruction 810 is "16" (in hexadecimal notation, 0×0010), therefore the instruction 810 is determined to be a long instruction. The instructions are re-arranged so that, in instructions 805 to 809, two short instructions are merged into one long-word instruction by analyzing data dependence relations among the instructions, and instruction 810 is provided as a long-word instruction because it is a long instruction. As a result, the instruction string becomes as shown in FIG. 26*d* and the size of the long-word instruction string of basic block B is determined to be 16 bytes.

Finally, basic block A is selected and a similar process is performed. As a result, the value of label LD in the instruction 804 is "24" (in hexadecimal notation, 0×0018) and cannot be represented by not more than five bits. Thus, the instruction 804 is a long instruction. The instructions are re-arranged so that, in instructions 801 to 803, two short instructions are combined into one long-word instruction by analyzing data dependence relations among the instructions, and instruction 804 is provided as a long-word instruction because it is a long instruction. As a result, the instruction string becomes as shown in FIG. 26*e*. Thus, the long-word instruction string of basic block A is 12 bytes.

The size resolution code 209 in which displacements of relative branch instructions are determined is shown in FIG. 27. In-function addresses are shown on the left of the long-word instructions.

According to the fourth embodiment described above, in a VLIW processor which requires instruction parallelized scheduling, the size of a constant to be resolved as an address difference can be estimated and the optimized order in which basic blocks are scheduled can be determined.

Fifth Embodiment

A simple approach to branch size estimation in the case where a size dependence graph contains no cycle has been described in the first embodiment and a more complicated branch size estimation approach which applies to the case where a size dependence graph contains cycles has been described in the second and third embodiments. However, the second and third embodiments have the problem that, in the case where cycles exist, an accurate branch size cannot be estimated and the code size increases, or even if an accurate branch size can be estimated, processing time may increase compared to the case where no cycle exists. Further the increase of the number of the cycles in the size dependence graph makes the problem more serious.

Therefore, cycles in a size dependence graph should preferably be eliminated or minimized.

In a fifth embodiment, cycles in a size dependence graph can be minimized by changing the physical positions of basic blocks without altering a control structure among the basic blocks.

Processor Used with the Fifth Embodiment

It is assumed that the processor used with the fifth embodiment is the same as the processor used with the first embodiment.

Figure 29:
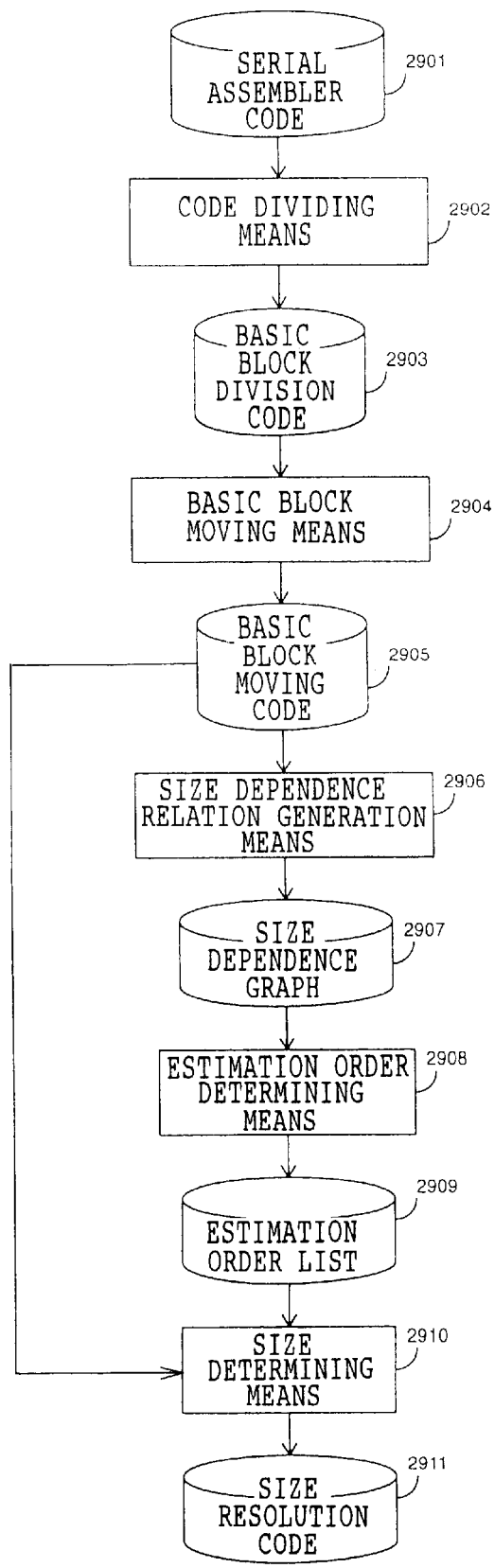
FIG. 29 shows a block diagram of a configuration and input/output data of an instruction string optimization apparatus.

Configuration of the Instruction String Optimization Apparatus of the Fifth Embodiment FIG. 29 shows a configuration of the instruction string optimization apparatus according to the fifth embodiment.

The instruction string optimization apparatus accept a serial assembler code 2901 provided by a compiler, changes the positions of basic blocks, determines the size of a constant to be resolved as an address difference, and outputs the results as a size resolution code 2911.

The configuration shown in FIG. 29 is different from the configuration of the apparatus of the first embodiment shown in FIG. 2 in that it includes basic block moving means 2904. The basic block moving means 2904 changes the physical positions of basic blocks in a basic block division code 2903 without altering a control structure so that a size dependence graph 2907 generated subsequently does not contain any cycle and outputs the basic block moving code 2905.

Next, the basic block moving means 2904 is described below in detail. Details of the other means shown in FIG. 29 is similar to that of the first or second embodiment and therefore they are omitted.

(Basic Block Moving Means 2904)

First, the reason why the positions of basic block are required to be changed in the basic block moving means 2904.

Figure 37A:
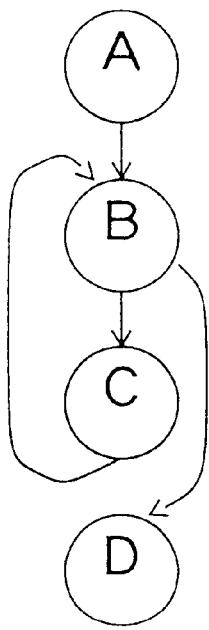
FIGS. 37a through 37d show an example of a control structure (37a) for a basic block, a size dependence graph (37b) for the control structure (37a), a control structure (37c) after the positions of basic block are changed, and a size dependence graph (37d) for the control structure (37c).

FIG. 37*a* shows an example of a control structure for basic blocks. The basic blocks in this example are written in the order of A-B-C-D on the assembler code. There is a loop between basic blocks B and C in the control structure. A path is provided from basic block A to B as an entry to the loop and another path is provided from basic block B to D as an exit from the loop. When a size dependence graph is created from FIG. 37*a*, a cycle is created between basic blocks B and C as shown in FIG. 37*b*.

Figure 37B:
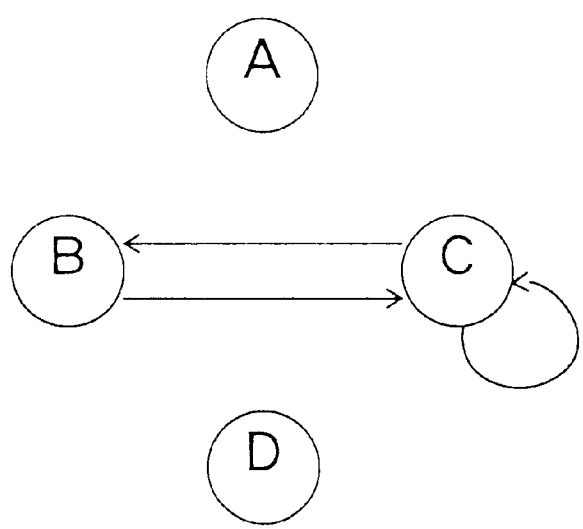
Figure 37C:
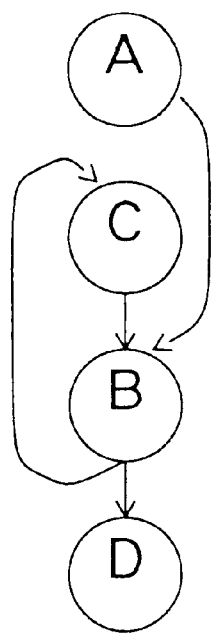

Therefore, the physical positions of the basic blocks are changed without altering the control structure for basic blocks B and C as shown in FIG. 37c. The basic blocks in FIG. 37c are arranged in the order of basic blocks A-C-B-D on the assembler code. Although the physical positions of the basic blocks are changed, the control structure is not altered, that is, a loop is created between basic blocks B and C and the entry path to the loop is from basic block A to B and the exit path from the loop is from basic block B to D.

Figure 37D:
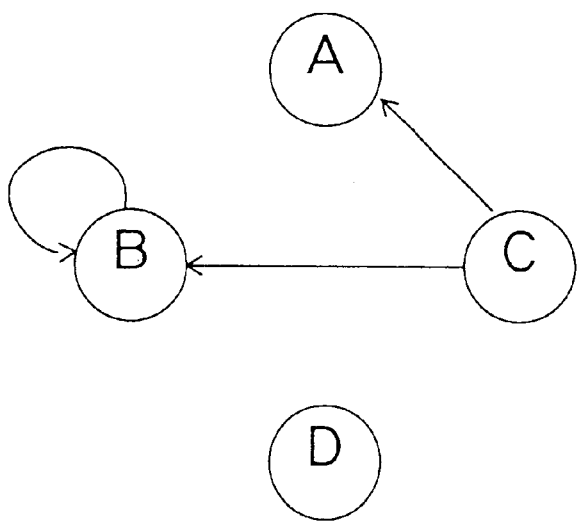

When a size dependence graph is created from FIG. 37c, the cycle between B and C in FIG. 37b disappears and there is no cycle other than a self-cycle as shown in FIG. 37d.

That is, if exits from the loop exist in the middle of the loop and no exit exists at the end of the loop, the number of cycles in the size dependence graph is reduced by moving one of the exits to the end of the loop.

A process performed in the basic block moving means 2904 for changing positions of basic blocks in this way will be described below.

Figure 30:
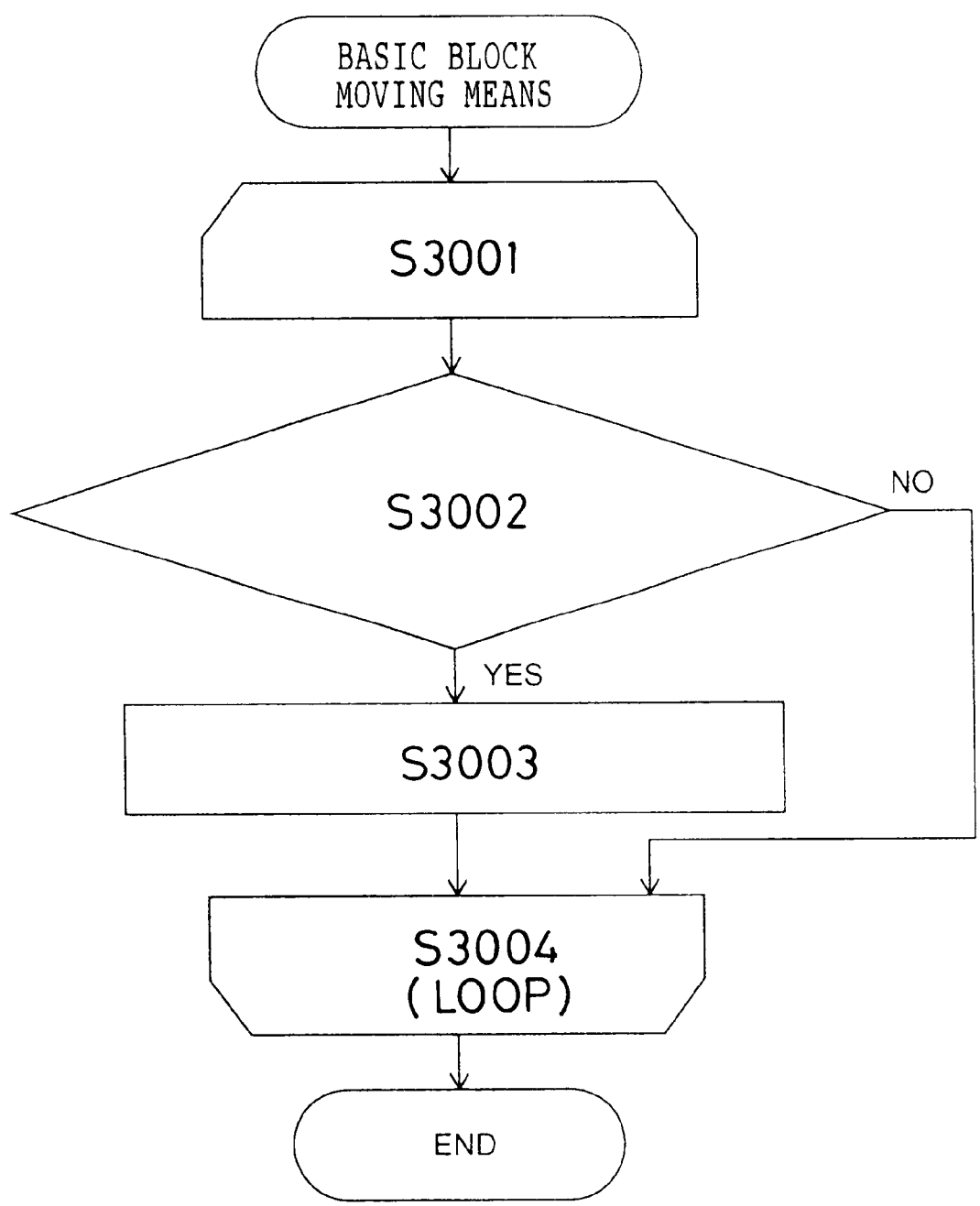
FIG. 30 shows a flowchart of a process performed in basic block moving means 2904.

FIG. 30 shows a flowchart performed in the basic block moving means 2904.

Basic blocks in a basic block division code 2903 are checked for a backward unconditional branch (an unconditional branch to a lower address) and the following process (step S3002 to S3003) is performed on each of all such basic blocks to change the positions of basic blocks (step S3001).

It is determined whether, in basic blocks forming a loop from the target basic block of an unconditional branch to a basic block containing the unconditional branch instruction, a branch instruction exists or not which branches to a basic block in the forward direction of the basic block containing the unconditional branch instruction, i.e. a branch instruction which branches from inside of loop to outside of the loop (step S3002). If no, the process proceeds to step S3004.

If yes, a basic block containing one of such branch instructions is moved to the end of the loop, and the positions of the basic blocks in the loop are changed without altering the initial control structure. This operation entails modification such as deleting, adding, and reversing a branch instruction or updating a branch target in the basic block (step S3003).

Then, the process returns to step S3001 and the above-mentioned process is repeated (step S3004).

In this way, in order to avoid generating a cycle in a size dependence graph 2907 which will be created at a subsequent stage, the positions of the basic blocks are changed without altering the control'structure in the basic block division code 2903 to output a basic block moving code 2905.

Operations of the Instruction String Optimization Apparatus

Operations of characteristic components of the instruction string optimization apparatus will be described with respect to a specific instruction string.

EXAMPLE 1

Figure 31:
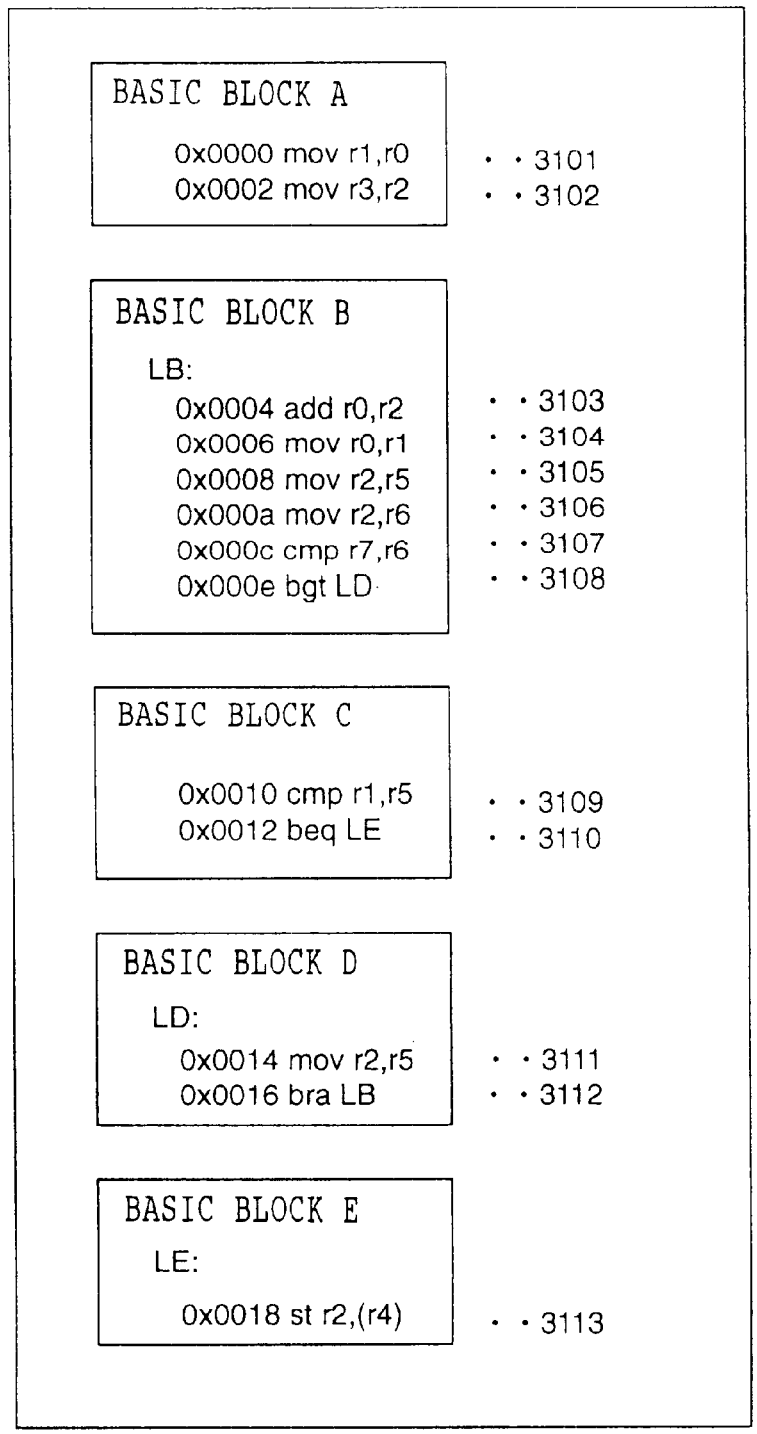
FIG. 31 shows an example of the basic block division code 2903 output from the code dividing means 2902.

A code shown in FIG. 31 is used as an example of a basic block division code 2903 output from code dividing means 2902. While in-function addresses are shown on the left of instructions for readability, these addresses are different from their real addresses at run time of the processor. Operations performed in the code dividing means 2902 are the same as in conventional basic block division technologies, therefore the description of which is omitted.

The subsequent operations will be described below in detail.

(Basic Block Moving Means 2904)

The basic block moving means 2904 changes the physical positions of basic blocks in the basic block division code 2903 shown in FIG. 31 without altering the control structure so as not to create a cycle in a size dependence graph 2907 generated subsequently, and outputs the results as a basic block moving code 2905.

First, the basic block division code 2903 shown in FIG. 31 is checked for a basic block which contains a backward unconditional branch. Then, instruction 3112 is found to be a backward unconditional branch and steps S3002 through S3003 are performed on basic block D containing this instruction (step S3001).

Basic blocks from basic block B which is the target of unconditional instruction 3112 to block D which contains unconditional branch instruction 3112 are checked for a branch instruction which branches to a target in the forward direction of basic block D. As a result, instruction 3110 in basic block C is found to be a branch to basic block E ahead of basic block D (step S3002).

Because the branch instruction exists which branches to a target ahead of basic block D, block C containing the branch instruction 3110 is moved to the end of the loop and the positions of basic blocks D and B in the loop are changed in such a way that the initial control structure is not altered. As a result, the physical arrangement of the basic blocks in the loop is in the order of D-B-C. This operation entails adding an unconditional branch instruction "bra LB" to basic block A, deleting unconditional branch instruction 3112 from basic block D, and reversing the condition of conditional branch instruction 3110 and changing its target to LD in the basic block (step S3003).

Thereafter, because there is no other basic block which contains a backward unconditional branch instruction, the process performed by the basic block moving means 2904 ends.

Figure 32:
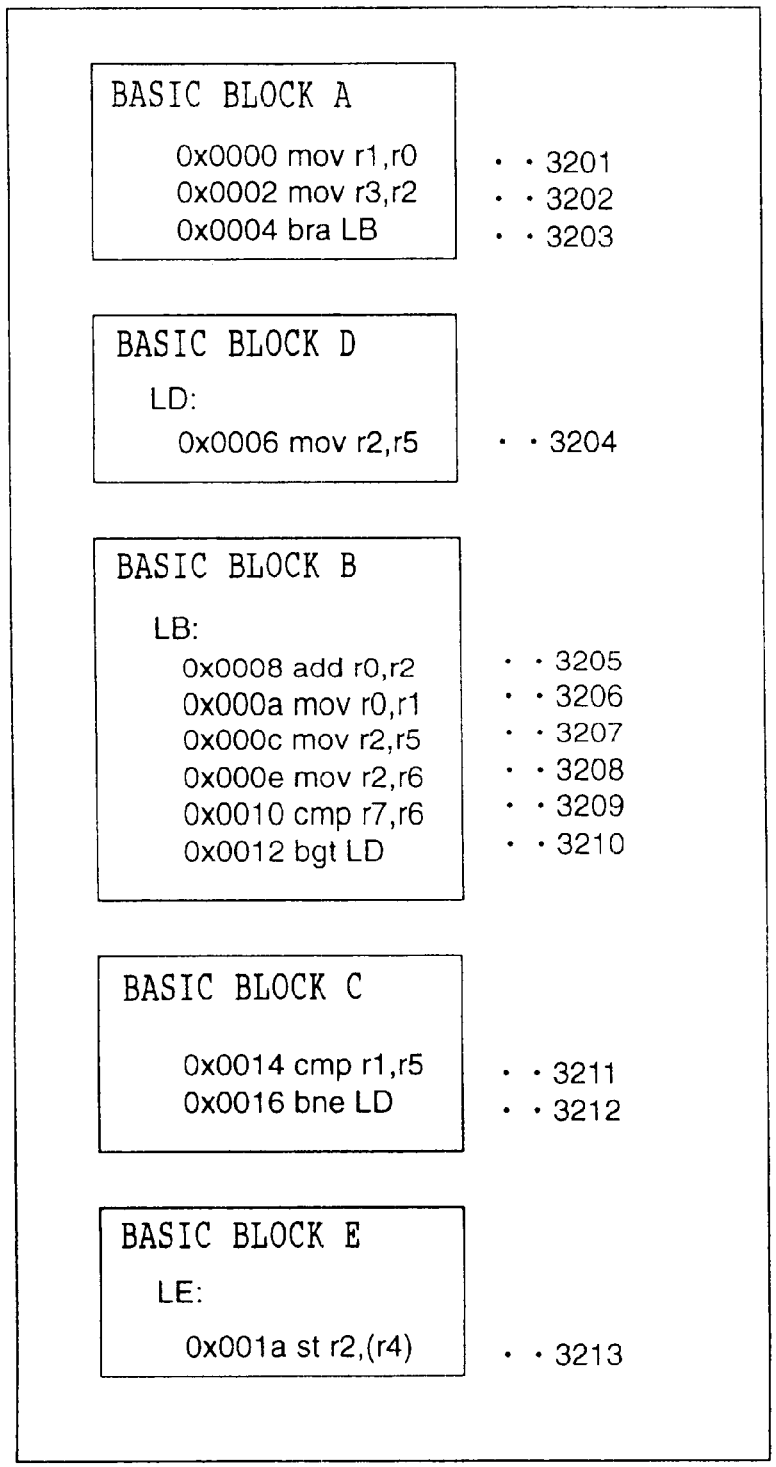
FIG. 32 shows a basic block moving code 2905 which is output when the basic block division code 2903 in FIG. 31 is input to the basic block moving means 2904.

The resulting basic block moving code 2905 in which the basic blocks are moved and branch instructions are modified in this way is shown in FIG. 32.

(Size Dependence Relation Generation Means 2906)

The size dependence relation generation means 2906 analyzes dependence relations among basic blocks in the basic block moving code 2905 shown in FIG. 32 and outputs the result as a size dependence graph 2907.

Figure 33A:
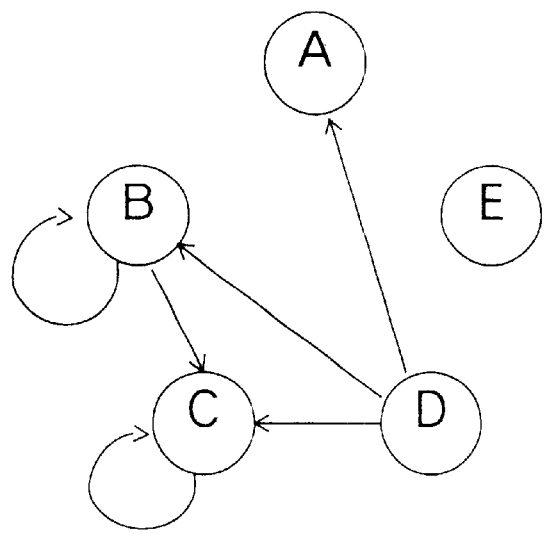
FIGS. 33a and 33b show a size dependence graph 2906 (33a) which is output when the basic block moving code 2905 in FIG. 32 is input to the size dependence relation generation means 2906 and a size dependence graph 2906 (33b) which is output when the basic block division code 2903 in FIG. 31 is input to the size dependence relation generation means 2906.
Figure 33B:
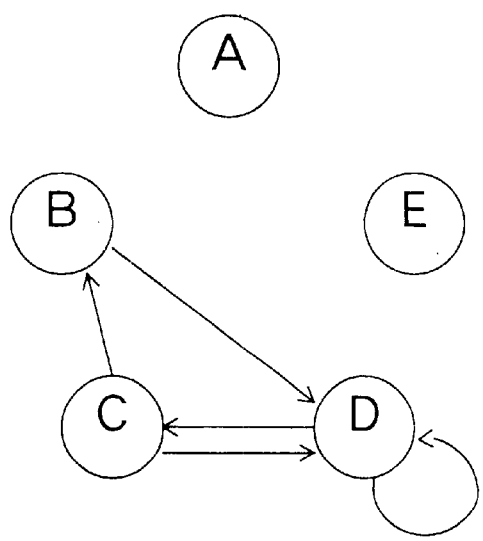

Dependence relations are determined by performing a similar process of the first embodiment and the size dependence graph 2907 shown in FIG. 33a is generated. Compare this size dependence graph 2907 in FIG. 33a with a size dependence graph 2907 shown in FIG. 33b which is generated from the basic block division code 2903 in FIG. 31 in which the position of basic blocks are not changed. The cycle produced between basic blocks C and D in the graph in FIG. 33b disappears in the graph in FIG. 33a and there is no cycle other than a self-loop. Therefore, in the subsequent process, the branch size estimation speed is increased, or the process can be simplified by using the method in the first embodiment which assumes the absence of cycles to perform branch size estimation.

The branch size estimation process in estimation order determining means 2908 and size determining means 2910 are similar to that of the first or second embodiment.

The code generated by changing the position of basic blocks as described above enables the improvement of the process speed or the simplification of the processes without increasing the code size or lowering the performance compared to a code generated without changing the position of basic blocks.

EXAMPLE 2

Figure 34:
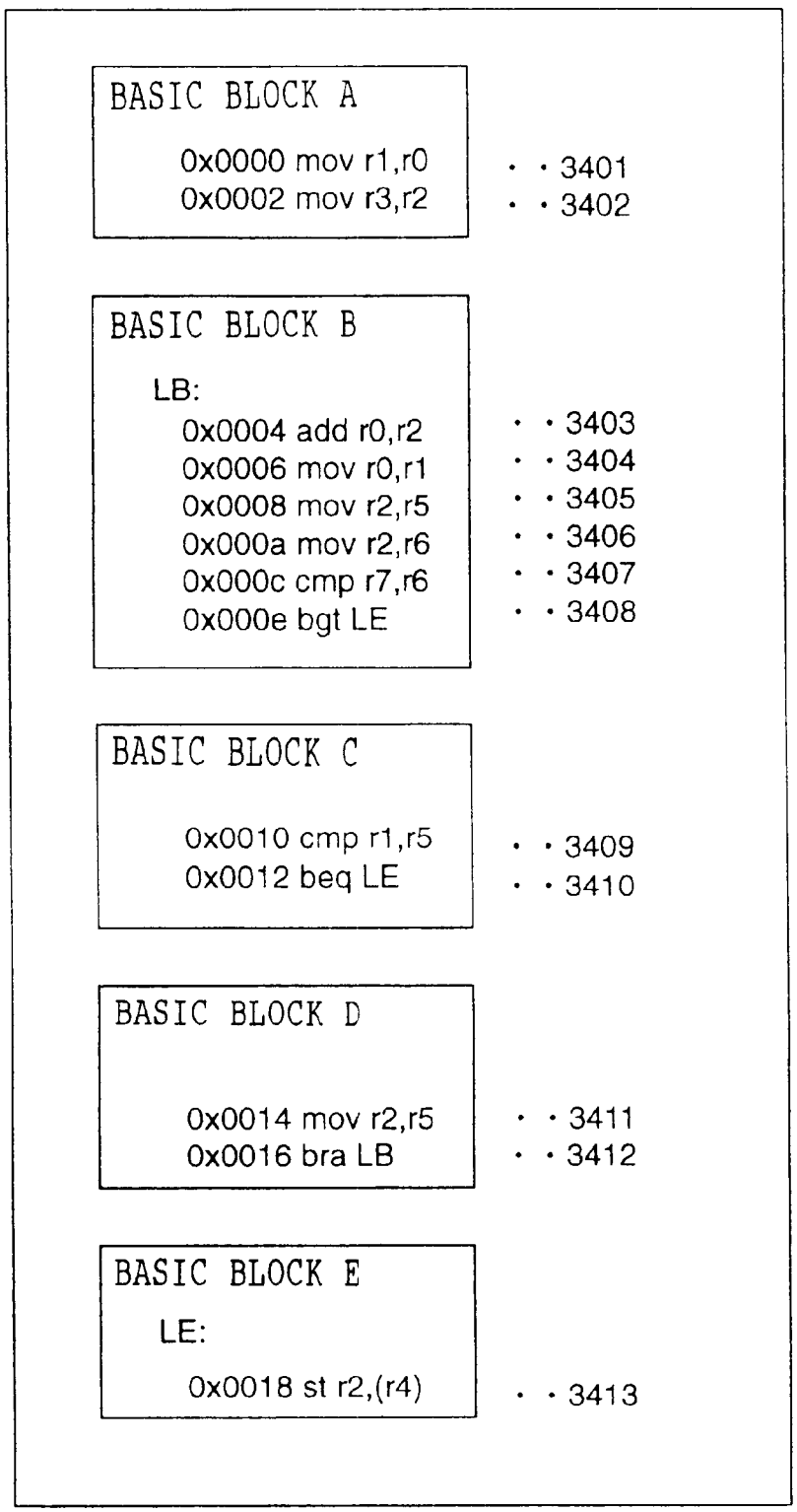
FIG. 34 shows an example of the basic block division code 2903 output from the code dividing means 2902.

A code shown in FIG. 34 is used as an example of a basic block division code 2903 output from the code dividing means 2902. In FIG. 34, branch target label LD of branch instruction 3108 in basic block B in FIG. 31 is changed to label LE.

(Basic Block Moving Means 2904)

The basic block division code 2903 shown in FIG. 34 is checked for a basic block containing a backward unconditional branch and instruction 3412 is identified as a backward unconditional branch. Then, steps S3002 to S3003 are performed on basic block D which contains this instruction (step S3001).

Basic blocks from basic block B to which unconditional branch instruction 3412 branches to and basic block D containing unconditional branch instruction 3412 are checked for a branch instruction ahead of basic block D. It is found that instruction 3408 in basic block B branches to basic block E ahead of basic block D and instruction 3410 in basic block C also branches to basic block E (step S3002).

Because the branch instructions exist ahead of basic block D, basic block B containing instruction 3408 of one of the two branch instructions is moved to the end of the loop and the position of basic blocks C and D in the loop is changed so that the initial control structure is not affected. As a result, the physical positions of the basic blocks in the loop are arranged in the order of C-D-B. This rearrangement entails adding an unconditional branch instruction "bra LB" to basic block A, deleting unconditional branch instruction 3412 from basic block D, and reversing the condition of conditional branch instruction 3408 and changing its target to LC in the basic block B (step S3003).

Thereafter, because there is no other basic block which contains a backward unconditional branch instruction, the process performed by the basic block moving means 2904 ends.

Figure 35:
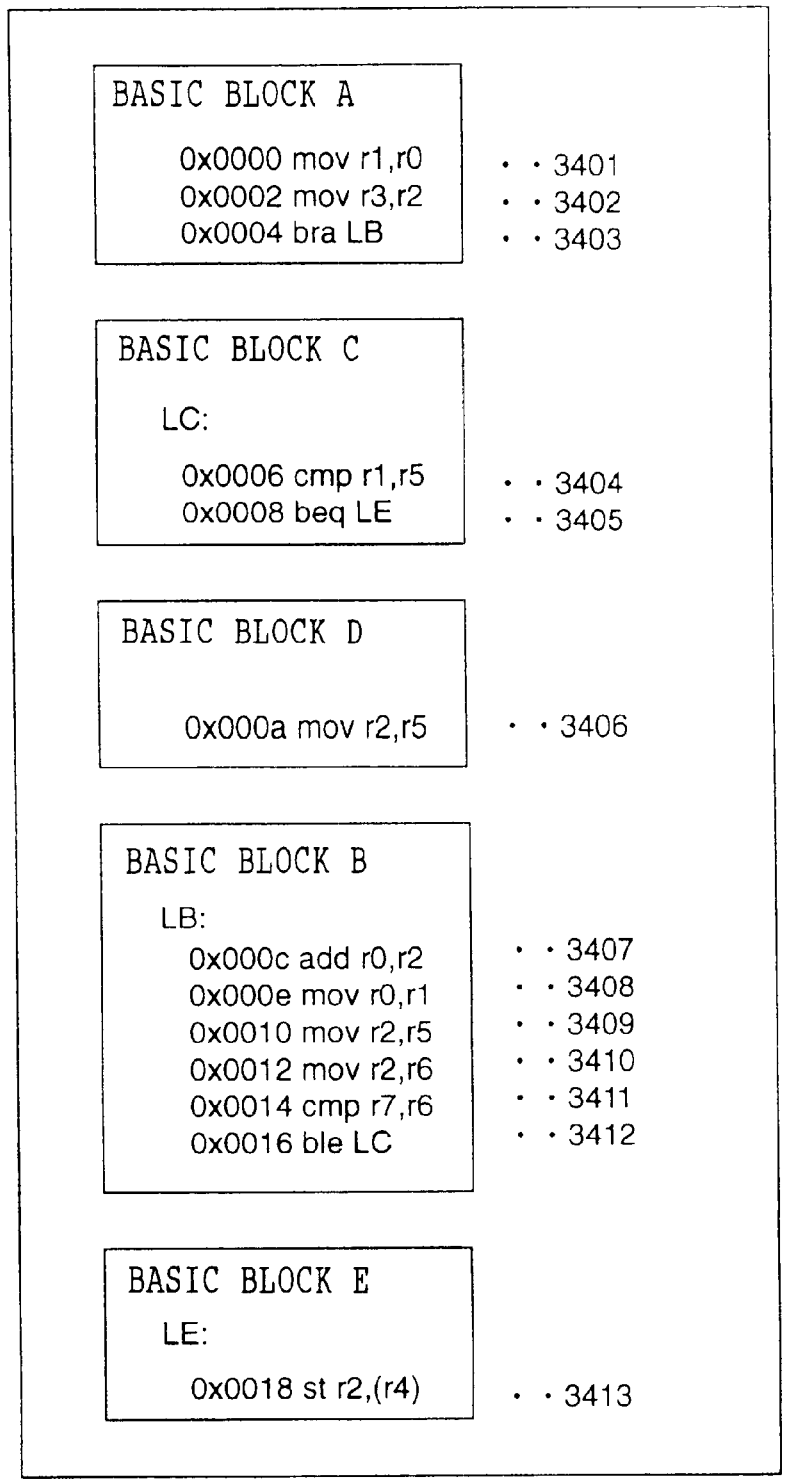
FIG. 35 shows a basic block moving code 2905 which is output when the basic block division code 2903 in FIG. 34 is input to the basic block moving means 2904.

The resulting basic block moving code 2905 in which the basic blocks are moved and branch instructions are modified in this way is shown in FIG. 35.

(Size Dependence Relation Generation Means 2906)

Figure 36A:
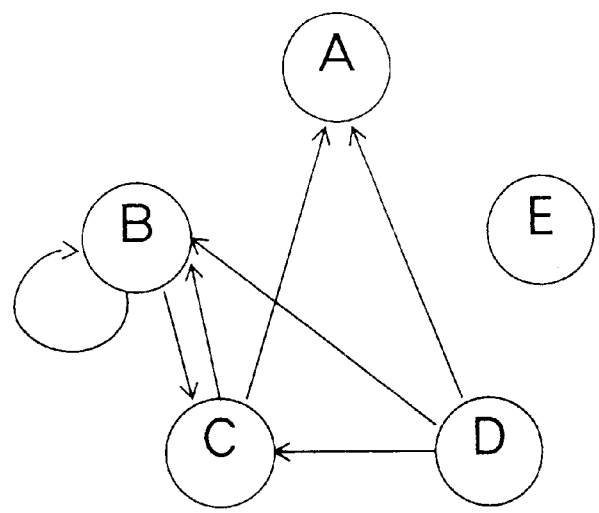
FIGS. 36a and 36b show a size dependence graph 2906 (33a) which is output when the basic block moving code 2905 in FIG. 35 is input to the size dependence relation generation means 2906 and a size dependence graph 2906 (33b) which is output when the basic block division code 2903 in FIG. 34 is input to the size dependence relation generation means 2906.
Figure 36B:
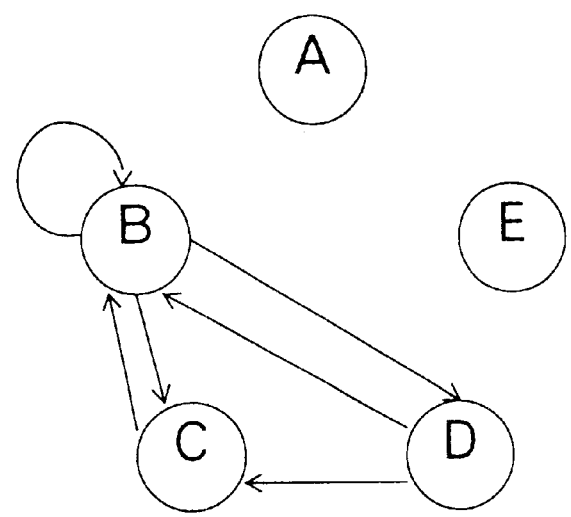

In the size dependence relation generation means 2906, dependence relations are analyzed and the size dependence graph 2907 shown in FIG. 36a is generated. As comparing this size dependence graph 2907 in FIG. 36a with a size dependence graph 2907 shown in FIG. 36b which is generated from the basic block division code 2903 in FIG. 34 in which the position of basic blocks are not changed, the cycle produced between basic blocks B and D in the graph in FIG. 36b disappears and the total number of cycles is reduced in the graph in FIG. 36a. Thus, the process speed of branch size estimation in the subsequent process is increased.

The branch size estimation process in estimation order determining means 2908 and size determining means 2910 are similar to that of the first or second embodiment.

This embodiment allows cycles in a size dependence graph generated by the size dependence relation generation means to be eliminated or minimized, therefore the process speed of subsequent processes can be increased or the processes can be simplified.

The embodiments of the instruction string optimization apparatus according to the present invention have been described.

While size dependence relations are represented by size dependence graphs as shown in FIG. 9 in the embodiments described above in order to facilitate the understanding of the present invention, on a real computer the size dependence graphs are implemented as, for example, a table comprising basic blocks and their depended basic blocks as shown in FIG. 28.

FIGS. 28a, 28b, and 28c correspond to representations shown in FIGS. 9a, 9b, and 9c, respectively, which are the respective implementations on a computer. In the description of the algorithms, the expression "generate a node" is equivalent to registering the node in a basic block column in the table, the expression "draw a directed edge" is equivalent to registering a corresponding depended basic block in a depended basic block column, the expression "node having no incoming directed edge" is equivalent to a basic block which is dependent on no basic block, the expression "delete a node" is equivalent to deleting the basic block form the basic block column, and the expression "remove a directed edge outgoing from a node" is equivalent to deleting the basic block from the depended basic block column.

While a difference from the address of a branch instruction has been calculated in the embodiments described above, a difference from the address of an instruction next to the branch instruction may be used as a constant.

While the size of a constant to be resolved as an address difference has been determined, the size of an instruction which uses the constant may be determined rather than the size of the constant. That is, in the process of estimating the size of a constant, when the size of an instruction which uses a constant can be determined if the value of the constant size is a within a calculated range, a further estimation of the size of the constant is not required even if the accurate size of the constant is not determined yet. This allows the estimation of a constant size to be simplified.

While in the third embodiment an accurate value is calculated in estimating the size of a constant by using a cycle-containing graph 1806, the value can be assumed to be the maximum constant size or a constant size most frequently used in a processor of interest. This allows a faster estimation process.

While the fourth embodiment addresses a case where a dependence relation does not generates a cycle, the fourth embodiment may applies to a case where a dependence relation generates a cycle by making the estimation order determining means and the size determining means operate as in the second embodiment or by adding size estimating means as in the third embodiment.

The technology of changing the positions of basic blocks in the fifth embodiment may also be used effectively with VLIW processors which require parallel instruction scheduling as in the fourth embodiment.

As described above, the instruction string optimization apparatus according to the present invention is characterized by comprising code dividing means for dividing an instruction string comprising serially arranged instructions sets of basic blocks each of the blocks being a string of sequential instructions having no branch in or branches out in the middle of the string; size dependence relation generation means for generating a size dependence relation representing the correspondence between a basic block having a constant to be resolved as an address difference and a depended basic block comprising an instruction string having a size on which the size of said constant depends; estimation order determining means for analyzing the size dependence relation and determining the order in which constants to be resolved as an address difference of a basic block are estimated; and size determining means for determining an unresolved size of said constant in a basic block selected in said estimation means or determining an unresolved size of an instruction which uses said constant to be resolved in a basic block selected in said estimation order;

whereby the size of a constant to be resolved as an address difference can be estimated so as to be a value close to and not less than its actual size, thus the number of codes can be reduced and the process speed by a linker can be improved.

The size estimation order determining means may be configured in such a way that all the self-dependence relations in which a basic block is dependent on itself are removed from size dependence relations, any one of basic blocks which are dependent on no other basic block is selected in size dependence relations, the selected basic block and dependence relations in which a basic block is dependent on the selected basic block are removed from size dependence relations, and the selected basic block is appended to the end of the estimation order, and the above-mentioned process is repeated until no basic block which is dependent on no other basic blocks remains in size dependence relations.

Thus, the size estimation order reflecting the consideration of size dependence relation can be determined. Therefore, an unresolved size can be estimated accurately in the case where an instruction string in which no size dependence relation generates a cycle.

In another implementation, size estimation means may be provided which assumes the maximum size value used in a processor of interest as an unresolved size value in a basic block for which estimation order is not determined by the estimation order determining means.

This allows the unresolved size to be estimated quickly even in the case where an instruction string provides a size dependence relation which generates a cycle.

In another implementation, size estimation means may be provided which assumes a size value most frequently used in a processor of interest as an unresolved size value in a basic block for which estimation order is not determined by the estimation order determining means.

This allows the unresolved size to be estimated quickly even in the case where an instruction string provides a size dependence relation which generates a cycle, as in the above-mentioned implementation.

In another implementation, size estimation means may be provided which assumes the minimum size value used in a processor of interest as an unresolved size value in one basic block selected from each group of basic blocks which causes a size dependence relation cycle in basic blocks for which estimation order is not determined by the estimation order determining means, repeats the determination of an unresolved size value in each basic block in said group of basic blocks in sequence until variations in the unresolved size values are eliminated, and determines the unresolved size in each basic block which does not constitute said cycle.

This allows an unresolved constant size to be estimated accurately even in the case where an instruction string provides a size dependence relation which generates a cycle, as in the above-mentioned implementation.

In another implementation, the estimation order determining means may be configured in such a way that all the self-dependence relations in which a basic block is dependent on itself are removed from size dependence relations; any one of basic blocks which are dependent on the fewest number of other basic blocks is selected in size dependence relations; the selected basic block and dependence relations in which a basic block is dependent on the selected basic block are removed from size dependence relations; and the selected basic block is appended to the end of the estimation order, whereby the above-mentioned process is repeated until no basic block remains in size dependence relations; and wherein the size determining means is configured in such a way that: for a basic block selected according to the estimation order, if no unresolved basic block whose instruction size is not determined is not included in basic blocks on which the selected basic block is dependent, said unresolved size value is determined based on the size of said instruction string; and if an unresolved basic block is included in basic blocks on which the selected basic block is dependent, the maximum size value used in a processor of interest is assumed as said unresolved size value in all the unresolved basic blocks, the size of the instruction string of each of said unresolved basic blocks is calculated, and said unresolved size of the selected basic value is determined based on the calculated size of the instruction string of the basic block on which the selected basic block is dependent.

This allows the value of unresolved constant size to be estimated so as to be close to an actual value at relatively high speed even in the case where an instruction string provides a size dependence relation which generates a cycle.

In another implementation, the size estimation means may be configured in such a way that an unresolved size value in the basic block selected according to the estimation order is determined, and the constants to be resolved as the address difference of said basic block are positioned in one or more of the fields in a long-word instruction specifying a number of operations in the same number of the fields.

This allows the unresolved size to be determined and the order in which instructions are scheduled to be determined also in VLIW processors which require parallel instruction scheduling.

The size dependence relation generation means may be represented as a graph in which each basic block is represented by a node, and a directed edge is drawn to a node representing a basic block having a constant to be resolved as an address difference from a node representing a depended basic block on the instruction string of which the size of said constant is dependent on.

This allows the concept of size dependence relations to be handled as concrete data in the instruction string optimization apparatus and facilitates processing of the data.

Basic block moving means may be provided which changes the physical position of basic blocks with respect to each other not so as to generating a dependence relation cycle while avoiding affecting the control structure for the basic blocks by adding a branch instruction to the end of a basic block the position of which is changed or modifying or removing a branch instruction.

This allows size dependence cycle to be eliminated or minimized, thus the subsequent process can be performed at high speed or simplified.

The basic block moving means may be configured in such a way that, for a loop having a control structure in which only one basic block has an exit from the loop, the physical position relationship between basic blocks in the loop is changed so that said basic block having an exit is positioned at the end of the loop without altering the control structure.

This allows the elimination of size dependence relation cycles in the control structure in which only one basic block has an exit from the loop, thus the speed of the subsequent process can be improved or the process can be simplified.

Additionally, the basic block moving means may be configured in such a way that, for a loop having a control structure in which one or more basic block has an exit from the loop, the physical position relationship between basic blocks in the loop is changed so that on of basic blocks having an exit is positioned at the end of the loop without altering the control structure.

This eliminates or minimize size dependence relation cycles in the control structure in which one or more basic block have an exit from the loop, thus the process speed of the subsequent process can be improved or the process can be simplified.

What is claimed is:

1. An instruction string optimization apparatus comprising:

code dividing means for dividing an instruction string comprising serially arranged instructions into sets of basic blocks each of the blocks being a string of sequential instructions having no branch in or branch out in the middle of the string;

size dependence relation generation means for generating a size dependence relation representing the correspondence between a basic block having a constant to be resolved as an address difference and a depended basic block, the latter basic block being depended on by the former basic block and comprising an instruction string having a size on which the size of said constant depends;

estimation order determining means for analyzing the size dependence relation and determining the order in which constants to be resolved as an address difference of a basic block are estimated, and for removing self-dependent branching; and size determining means for determining an unresolved size of said constant to be resolved in a basic block selected according to said estimation order or determining an unresolved size of an instruction which uses said constant to be resolved in a basic block selected according to said estimation order.

2. The instruction string optimization apparatus as set forth in claim 1, wherein said size estimation order determining means is configured in such a way that:

all the self-dependence relations in which a basic block is dependent on itself are removed from size dependence relations;

any one of basic blocks which are dependent on no other basic block is selected in size dependence relations;

the selected basic block and dependence relations in which a basic block is dependent on the selected basic block are removed from size dependence relations; and the selected basic block is appended to the end of the estimation order, whereby the above-mentioned process is repeated until no basic block which is dependent on no other basic blocks remains in the size dependence relations.

3. The instruction string optimization apparatus as set forth in claim 2, comprising size estimation means which assumes the maximum size value used in a processor of interest as an unresolved size value in a basic block for which estimation order is not determined by the estimation order determining means.

4. The instruction string optimization apparatus as set forth in claim 2, comprising size estimation means which assumes a size value most frequently used in a processor of interest as an unresolved size value in a basic block for which estimation order is not determined by the estimation order determining means.

5. The instruction string optimization apparatus as set forth in claim 2, comprising size estimation means which assumes the minimum size value used in a processor of interest as an unresolved size value in one basic block selected from each group of basic blocks which causes a size dependence relation cycle in basic blocks for which estimation order is not determined by the estimation order determining means; repeats the determination of an unresolved size value in each basic block in said group of basic blocks in sequence until variations in the unresolved size values are eliminated; and determines the unresolved size in each basic block which does not constitute said cycle.

6. The instruction string optimization apparatus as set forth in claim 1, wherein the estimation order determining means is configured in such a way that:

all the self-dependence relations in which a basic block is dependent on itself are removed from size dependence relations;

any one of basic blocks which are dependent on the fewest number of other basic blocks is selected in size dependence relations;

the selected basic block and dependence relations in which a basic block is dependent on the selected basic block are removed from size dependence relations; and the selected basic block is appended to the end of the estimation order, whereby the above-mentioned process is repeated until no basic block remains in size dependence relations; and wherein the size determining means is configured in such a way that:

for a basic block selected according to the estimation order, if no unresolved basic block whose instruction string size is not determined is included in basic blocks on which the selected basic block is dependent, said unresolved size value is determined based on the size of said instruction string; and if an unresolved basic block is included in basic blocks on which the selected basic block is dependent, the maximum size value used in a processor of interest is assumed as said unresolved size value in all the unresolved basic blocks, the size of the instruction string of each of said unresolved basic blocks is calculated, and said unresolved size of the selected basic value is determined based on the calculated size of the instruction string of the basic block on which the selected basic block is dependent.

7. The instruction string optimization apparatus as set forth in claim 1, wherein said size determining means is configured in such a way that:

an unresolved size value in the basic block selected according to the estimation order is determined, and the constants to be resolved as the address difference of said basic block are positioned in one or more of the fields in a long-word instruction specifying a number of operations in one or more of the fields.

8. The instruction string optimization apparatus as set forth in claim 1, wherein said size dependence relation generation means is represented as a graph in which each basic block is represented by a node, and a directed edge is drawn to a node representing a basic block having a constant to be resolved as an address difference from a node representing a depended basic block, the latter basic block being depended on by the former basic block and comprising an the instruction string having a size on which the size of said constant depends.

9. The instruction string optimization apparatus as set forth in claim 1, comprising basic block moving means for changing the physical positional relationship between basic blocks so as not to generate a dependence relation cycle, and for avoiding affecting the control structure for the basic blocks by adding a branch instruction to the end of a basic block the position or by modifying or removing said branch instruction.

10. The instruction string optimization apparatus as set forth in claim 9, wherein the basic block moving means is configured in such a way that, for a loop having a control structure in which only one basic block has an exit from the loop, the physical positional relationship between basic blocks in the loop is changed so that said basic block having an exit is positioned at the end of the loop without altering the control structure.

11. The instruction string optimization apparatus as set forth in claim 9, wherein the basic block moving means is configured in such a way that, for a loop having a control structure in which one or more basic blocks have an exit from the loop, the physical positional relationship between basic blocks in the loop is changed so that one of the basic blocks having an exit is positioned at the end of the loop without altering the control structure.

* * * * *